United States Patent
Gundavelli et al.

(10) Patent No.: US 9,942,282 B2
(45) Date of Patent: Apr. 10, 2018

(54) VOICE OVER LTE SUPPORT FOR NON-UICC DEVICES ATTACHED TO AN LTE MOBILE ROUTER

(71) Applicant: CISCO TECHNOLOGY, INC., San Jose, CA (US)

(72) Inventors: Srinath Gundavelli, San Jose, CA (US); Vimal Srivastava, Bangalore (IN); Vojislav Vucetic, Holmdel, NJ (US)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 14/880,664

(22) Filed: Oct. 12, 2015

(65) Prior Publication Data
US 2017/0104795 A1    Apr. 13, 2017

(51) Int. Cl.
*H04L 29/06*    (2006.01)
*H04B 1/3816*    (2015.01)

(52) U.S. Cl.
CPC ....... *H04L 65/1073* (2013.01); *H04B 1/3816* (2013.01); *H04L 65/104* (2013.01); *H04L 65/105* (2013.01); *H04L 65/1006* (2013.01); *H04L 65/1016* (2013.01); *H04L 65/1069* (2013.01)

(58) Field of Classification Search
None
See application file for complete search history.

(56) References Cited

U.S. PATENT DOCUMENTS

| 9,167,008 | B2* | 10/2015 | Khan | H04L 65/1073 |
| 9,462,457 | B2* | 10/2016 | Gao | H04W 12/06 |
| 2014/0269511 | A1 | 9/2014 | Mitchell | |
| 2015/0007276 | A1* | 1/2015 | Fuller | H04L 63/0853 726/4 |
| 2015/0124804 | A1 | 5/2015 | Mitchell | |
| 2015/0208279 | A1* | 7/2015 | Lindoff | H04W 88/06 370/235 |

* cited by examiner

*Primary Examiner* — Anh Ngoc Nguyen
(74) *Attorney, Agent, or Firm* — Patterson + Sheridan, LLP

(57) ABSTRACT

In one embodiment a router connects to a cellular network using at least one authentication credential stored on a smart card of the router. The router receives, from a client device coupled to the router, a Session Initiation Protocol (SIP) request to register with an Internet Protocol Multimedia Subsystem (IMS) network coupled to the cellular network. The router sends a SIP registration request for the client device to the IMS network, the SIP registration request comprising authorization information associated with the router, wherein the authorization information associated with the router is used by the IMS network to register the client device with the IMS network.

20 Claims, 28 Drawing Sheets

US 9,942,282 B2

VOICE OVER LTE SUPPORT FOR NON-UICC DEVICES ATTACHED TO AN LTE MOBILE ROUTER

TECHNICAL FIELD

This disclosure relates in general to the field of communications and, more particularly, to voice over Long-Term Evolution (VoLTE) support for non-Universal Integrated Circuit Card (UICC) devices attached to an LTE mobile router.

BACKGROUND

A service provider's cellular network may provide endpoints with access to various networks attached to the cellular network, such as the Internet, an Internet Protocol Multimedia Subsystem (IMS) network, an enterprise network, or other network. These networks may provide various services to the endpoints, such as voice services (e.g., Voice over Internet Protocol) or other media services. In some situations, the endpoints and devices within these networks may communicate using different versions of a protocol.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a router connects to a cellular network using at least one or more of a plurality of authentication credential stored on a smart card of the router. The router receives, from a client device coupled to the router, a Session Initiation Protocol (SIP) request to register with an Internet Protocol Multimedia Subsystem (IMS) network coupled to the cellular network. The router sends a SIP registration request for the client device to the IMS network, the SIP registration request comprising authorization information associated with the router, wherein the authorization information associated with the router is used by the IMS network to register the client device with the IMS network.

Example Embodiments

Figure 1:
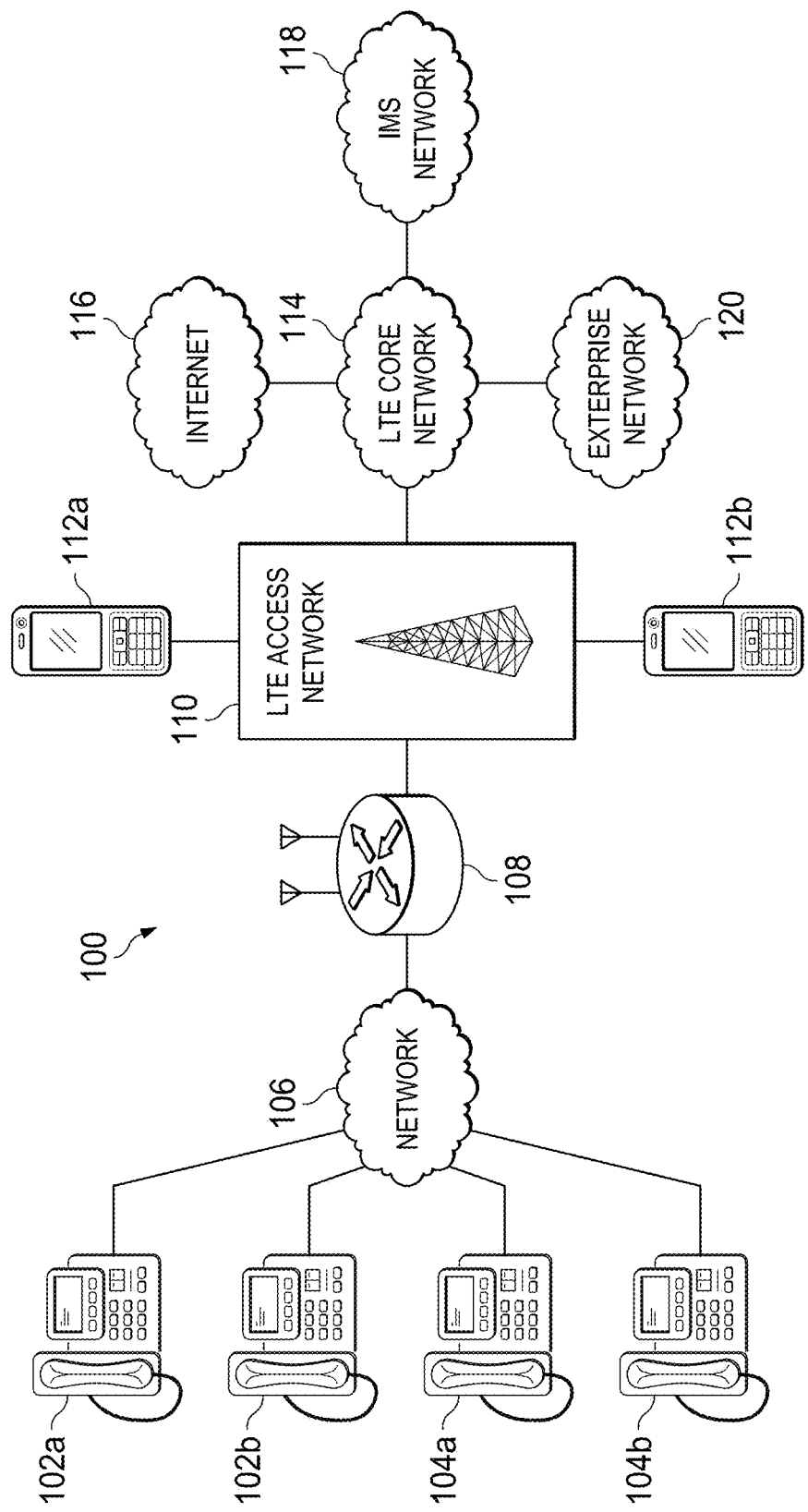
FIG. 1 illustrates a block diagram of a system for providing VoLTE support for non-UICC devices attached to an LTE mobile router in accordance with certain embodiments.

FIG. 1 illustrates a block diagram of a system for providing VoLTE support for non-Universal Integrated Circuit Card (UICC) client devices 102 and 104 attached to an LTE mobile router 108 in accordance with certain embodiments. System 100 includes client devices 102 and 104 coupled to router 108 through network 106. Router 108 is coupled to IMS network 118 through LTE access network 110 and LTE core network 114. LTE core network 114 may also be coupled to one or more other networks such as the Internet 116 or a corporate network 120. LTE access network may also provide network access to any suitable number of UICC client devices 112.

UICC client devices 112 and LTE mobile router 108 may include a UICC. A UICC is a smart card that may be installed in a device to allow the device to access a cellular network based upon subscriber identity information stored by the card. Non-UICC client devices 102 and 104 are devices that do not include a UICC. Accordingly, non-UICC devices 102 and 104 are not able to directly access LTE access network 110.

In various embodiments of the present disclosure, LTE mobile router 108 may function as a proxy for non-UICC client devices 102 and 104 and may use its own UICC to access the LTE access network 110 and associated services (e.g., services provided by IMS network 118) on behalf of multiple non-UICC client devices. In various embodiments, router 108 may also modify messages between particular non-UICC client devices 102 and the IMS network 118 to allow client devices 102 to use services provided by the IMS network 118 (e.g., the router may intercept SIP signaling from non-UICC client device 102 and convert the signaling to 3GPP IMS signaling before sending towards IMS network 118). The 3GPP IMS architecture specified in 3GPP TS 23.228 and TS 24.229 uses Session Initiation Protocol (SIP) as the base protocol for voice and other media services. Although IMS uses the standard SIP protocol, the protocol is used and extended to work with certain assumptions on the capabilities of devices functioning as IMS clients. For example, possible assumptions used in deploying IMS network 118 may include the IMS client being a UICC device, supporting IMS-specific calls flows, understanding 3GPP QoS bearer semantics, having the capability to react on events related to bearer establishment and bearer termination, or being able to perform Proxy-Call Session Control Function (P-CSCF) discovery. However, many SIP phones are non-UICC devices that are based on the standard SIP protocol which lacks such capabilities. For example, such 3GPP system-specific awareness and capabilities are not present in a generic RFC-3261 compatible SIP endpoint, especially when such a device does not have a direct 3GPP protocol interface. In various embodiments of the present disclosure, LTE mobile router 108 includes logic to provide the aforementioned functionalities to allow a standard SIP device (e.g., phone) coupled to the router to utilize SIP services provided through the IMS network 118.

Various embodiments of the present disclosure may allow mobile service providers to extend new LTE/IMS based services to enterprise branch offices of an organization. For example, particular embodiments of the present disclosure may enable a small enterprise branch office with an LTE mobile router to leverage a service provider's IMS infrastructure to allow voice services between enterprise sites.

Client devices 102, 104, and 112 may be any suitable computing devices operable to send and receive network traffic (e.g., data packets). In various embodiments, a "computing device" may be or comprise, by way of non-limiting example, a cellular telephone, IP telephone (e.g., an enterprise IP phone that uses SIP to communicate voice data), smart phone, computer, tablet computer, workstation, server, mainframe, embedded computer, embedded controller, embedded sensor, personal digital assistant, laptop computer, convertible tablet computer, computing appliance, network appliance, virtual machine, virtual appliance, or any other electronic, microelectronic, or microelectromechanical device for processing and communicating data. A client device may include an appropriate operating system, such as Microsoft Windows, Linux, Android, Mac OSX, Apple iOS, Unix, or similar operating system. Client devices 102, 104, and 112 may be communicatively coupled to one another and to other network resources via the networks.

In the embodiment depicted, client device 102 is a non-UICC SIP client device. As used herein, a non-UICC SIP client device is a device that does not include a UICC and is capable of communicating using a SIP protocol (e.g., is compliant with RFC 3261), but is not compliant with IMS (e.g., is not compliant with TS 23.228 and TS 24.229). For example, the non-UICC SIP client device 102 may not be configured to send IMS compliant messages.

As described above, a UICC is a smart card that may be installed in a device to allow the device to access a cellular network based upon subscriber identity information stored by the card. A UICC may include a processor or other logic, memory, and a communication interface to run one or more applications and communicate with the device in which it is installed. A UICC may run a software application, such as a Universal Subscriber Identity Module (USIM). A USIM may provide access to information identifying the subscriber, such as an international mobile subscriber identity (IMSI) number and an associated key, which may be used to identify and authenticate the subscriber to a service provider's cellular network. A UICC may also store information about the local network, a list of services the user has access to, contacts of the subscriber, or other information associated with the subscriber.

In the embodiment depicted, client device 104 is a non-UICC IMS client device. As used herein, a non-UICC IMS client device is a device that does not include a UICC, is capable of communicating using a SIP protocol (e.g., is compliant with RFC 3261), and is compliant with IMS (e.g., is compliant with TS 23.228 and TS 24.229). For example, the non-UICC IMS client device 104 may be configured to send IMS compliant messages.

In the embodiment depicted, client device 112 is a UICC IMS client device. As used herein, a UICC IMS client device is a device that includes a UICC, is capable of communicating using a SIP protocol (e.g., is compliant with RFC 3261), and is compliant with IMS (e.g., is compliant with TS 23.228 and TS 24.229). Client device 112 may directly connect to LTE access network 110 (and access LTE core network 114 and IMS network 118 or other networks coupled to LTE core network 114 through the LTE access network 110) utilizing the UICC of client device 112.

LTE mobile router 108 is a router that includes a UICC for connecting to a mobile network. In the embodiment depicted, router 108 couples to the LTE access network 110 (e.g., via a wireless connection with a transceiver of the access network), LTE core network 114, and one or more other networks coupled to the LTE core network 114. The router 108 may act as a proxy for the client devices 102 and 104 to allow the devices to access the IMS network 118 via mobile network credentials (e.g., an IMSI) stored by a UICC of router 108. The router may enable Voice over Internet Protocol (VoIP) calling by client devices 102 and 104 to each other and to other devices within a network attached to the LTE core network. Router 108 may function as a gateway to provide IP connectivity and Evolved Packet Core (EPC) access to the LTE network to client devices 102 and 104 and to other suitable devices. In various embodiments, router 108 may be compliant to 3GPP TS 23.401 for S5/S8 based EPC connectivity. In various embodiments, router 108 may use its UICC to couple to other mobile networks if the LTE network is unavailable. Router 108 may enable client devices 102 and 104 to have their own phone numbers, despite lacking UICCs.

In various embodiments, router 108 may be operable to process and/or forward network traffic. Router 108 may include any suitable hardware, software, components, modules, interfaces, or objects that facilitate operations associated with processing and/or forwarding network traffic. This may be inclusive of appropriate algorithms and communication protocols that allow for the effective exchange of data or information. In some embodiments, router 108 includes a multi-port network bridge that processes and routes data at a data link layer (Layer 2). Additionally or alternatively, router 108 may process and/or route data at other various layers such as a Layer 3 network layer, Layer 4 (with network address translation and load distribution), Layer 7 (load distribution based on application specific transactions), or at multiple layers (e.g., Layer 2 and Layer 3). In certain embodiments, router 108 may include functionalities of a switch and/or gateway.

The networks described herein (e.g., networks 106, 110, 114, 116, 118, and 120) may be any suitable network or combination of one or more networks operating on one or more suitable networking protocols. A network may represent a series of points, nodes, or network elements and interconnected communication paths for receiving and transmitting packets of information that propagate through a communication system. For example, a network may include one or more firewalls, routers, switches, security appliances, antivirus servers, or other useful network devices. A network offers a communicative interface between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment depending on the network topology. A network can comprise any number of hardware or software elements coupled to (and in communication with) each other through a communications medium. In some embodiments, a network may be as simple as a connection such as a cable (e.g., an Ethernet cable), air, or other transmission medium. For example, in a particular embodiment, network 106 may comprise Ethernet cords or wireless connections coupling client devices 102 and 104 to router 108.

LTE access network 110 may comprise a network of transceivers, such as Evolved Node B (eNodeB) transceivers coupled together in any suitable manner, such as through X2 interfaces. In one embodiments, access network 110 may be an Evolved UMTS Terrestrial Radio Access Network (E-UTRAN). Any suitable component of the access network 110 may be coupled to one or more components of the LTE core network 114 (e.g., a serving gateway (SGW) or mobility management entity (MME)) in any suitable manner, such as through one or more S1 interfaces. LTE access network 110 may be responsible for radio-related functions of the LTE network, such as radio resource management (e.g., radio bearer control, radio admission control, scheduling and allocation of resources to user endpoints), header compression (e.g., compression of VoIP packet headers), and encryption of data sent over the radio interface.

LTE core network 114 is responsible for the overall control of endpoints and establishment of the bearers that will carry data between client devices 102, 104, and 112 and various networks coupled to the core network 114, such as the Internet 116, IMS network 118, or an enterprise network 120. LTE core network 114 will be explained in more detail in connection with FIG. 3.

Internet 116 comprises a global system of interconnected computer networks to which various devices using any suitable protocols may be attached. Enterprise network 120 may comprise a network belonging to a particular entity, such as a company, government, education institution, or other group and may comprise one or more LANs or other networks. In one embodiment, enterprise network 120 may represent an enterprise's main site, while client devices 102 and 104 may be located at a branch site of the enterprise.

IMS network 118 may comprise components adapted to provide control of any suitable IP multimedia services (e.g., VoIP, instant messaging, videoconferencing, video on demand, etc.) to client devices 102, 104, and 112. IMS network 118 may rely on SIP as a signaling mechanism, thereby allowing voice, text and multimedia services to traverse networks coupled to IMS network 118. IMS network 118 may include a control plane based on a SIP infrastructure and a user plane based on Real-time Transport Protocol (RTP). In various embodiments, IMS network 118 may enable real-time consumer and enterprise communication services over a variety of access technologies, including LTE, Wi-Fi, High Speed Packet Access (HSPA), or other suitable access technology. IMS network 118 will be explained in more detail in connection with FIG. 4.

Figure 2:
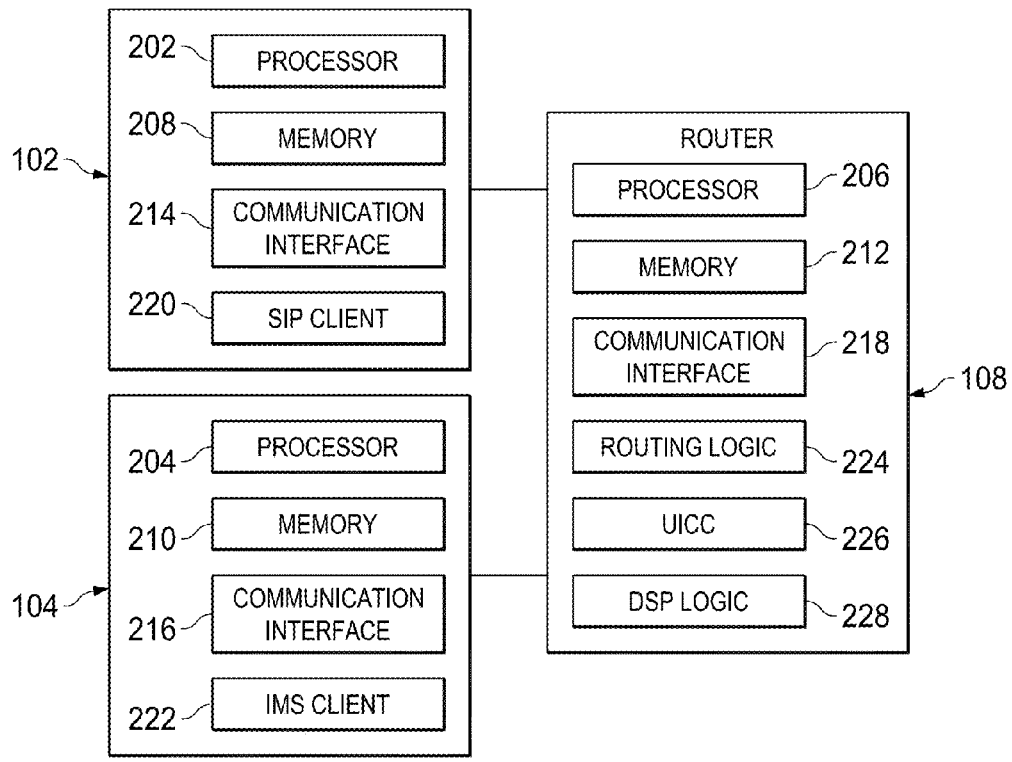
FIG. 2 illustrates non-UICC client devices and an LTE mobile router in accordance with certain embodiments.

FIG. 2 illustrates non-UICC client devices 102 and 104 and an LTE mobile router 108 in accordance with certain embodiments. In various embodiments, non-UICC client devices 102 and 104 and LTE mobile router 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

In the embodiment depicted, client devices 102 and 104 and router 108 include a computer system to facilitate performance of its operations. In particular embodiments, a computer system may include a processor, memory, and one or more communication interfaces, among other components. As an example, client device 102 comprises a computer system that includes one or more processors 202, one or more memories 208, and one or more communication interfaces 214; client device 104 comprises a computer system that includes one or more processors 204, one or more memories 210, and one or more communication interfaces 216; and router 108 comprises a computer system that includes one or more processors 206, one or more memories 212, and one or more communication interfaces 218. These components may work together in order to provide functionality of their respective systems as described herein.

Processors 202, 204, or 206 may be a microprocessor, controller, or any other suitable computing device, resource, or combination of hardware, stored software and/or encoded logic operable to provide, either alone or in conjunction with other components of their constituent devices, the functionality of the respective devices. In some embodiments, client devices 102 or 104 or router 108 may utilize multiple processors to perform the functions described herein.

The processor can execute any type of instructions to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 208, 210, or 212 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. The memory may store any suitable data or information utilized by its constituent device, including software embedded in a computer readable medium, and/or encoded logic incorporated in hardware or otherwise stored (e.g., firmware). The memory may also store the results and/or intermediate results of the various calculations and determinations performed by its associated processor.

A communication interface 214, 216, or 218 may be used for the communication of signaling and/or data between client devices 102 and 104, router 108, and one or more networks (e.g., 106, 110, 114, 116, 118, and 120) and/or network nodes coupled to a network or other communication channel. For example, the communication interface may be used to send and receive network traffic such as data packets. The communication interface may send and receive data and/or signals according to any suitable standard such as Asynchronous Transfer Mode (ATM), Frame Relay, Gigabit Ethernet (or other IEEE 802.3 standard), IEEE 802.11 standard, or other suitable wireline or wireless standard.

In various embodiments, the computer system of router 108 may execute any suitable operating system such as Cisco IOS, Cisco NX-OS, or other suitable operating system. In addition to a computer system, router 108 may include routing logic 224, UICCC 226, and digital signal processing (DSP) logic 228, among other components. Routing logic 224 may include logic to receive data packets, determine where to send the data packets to, modify the data packets if necessary, and to send the data packets towards their destination. In some embodiments, routing logic 224 may include dedicated logic for performing routing and/or switching functions (e.g., at wire speed). Router 108 may also comprise a UICC as described above. Router 108 may also comprise DSP logic 228 which may include one or more specialized processors to perform DSP operations, such as filtering, compressing, decompressing, transcoding, or other suitable operations. As one example, DSP logic 228 may include one or more codecs, such as a G711 ALaw Media codec and an AMR Media codec, to encode data in a desired format.

Figure 3:
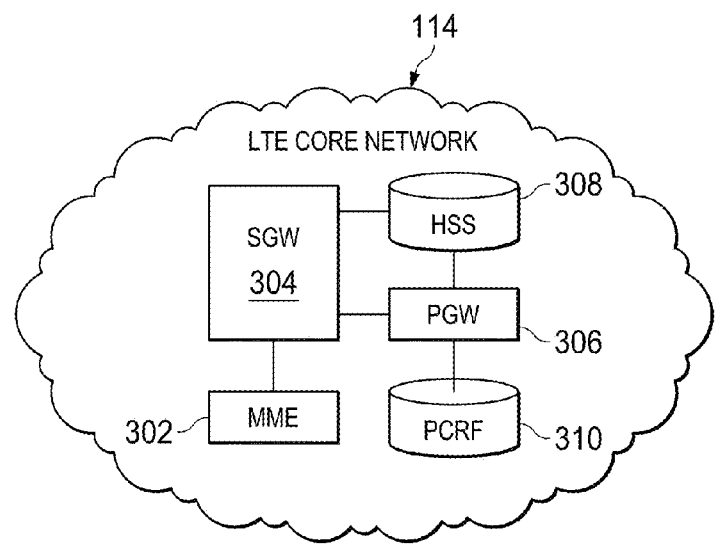
FIG. 3 illustrates an LTE core network in accordance with certain embodiments.

FIG. 3 illustrates an LTE core network 114 in accordance with certain embodiments. In the embodiment depicted, core network 114 includes MME 302, SGW 304, Packet Data Network Gateway (PGW) 306, Home Subscriber Server (HSS) 308, and PCRF 310, though other embodiments may include any other suitable components. In some embodiments, one or more components of the core network can be implemented on the same gateway or chassis. In various embodiments, LTE core network 114 may be an Evolved Packet Core (EPC).

The MME 302 may reside in the control plane of the LTE core network 114 (e.g., EPC) and manages session states, authentication, paging, mobility with 3GPP 2G/3G nodes, roaming, and other bearer management functions. The MME 302 can be a standalone element or integrated with other core network elements, including, e.g., the SGW 304, PGW 306, and Release 8 Serving GPRS Support Node (SGSN). The MME 302 can also be integrated with 2G/3G elements, such as the SGSN and GGSN. This integration may facilitate mobility and session management interworking between 2G/3G and 4G mobile networks.

The MME 302 is a control-node for the LTE access network 110. The MME 302 is responsible for UE (e.g., router 108 or client device 112) tracking and paging procedures including retransmissions. The MME 302 handles the bearer activation/deactivation process and is also responsible for choosing the SGW 304 for a UE at the initial attachment and at time of an intra-LTE handover as well as selecting an appropriate PGW (e.g., PGW 306). The MME 302 also authenticates the user by interacting with the HSS 308. The MME 302 also generates and allocates temporary identities to UEs and terminates Network Access Server (NAS) signaling. The MME 302 checks the authorization of the UE to camp on the service provider's Public Land Mobile Network (PLMN) and enforces UE roaming restrictions. The MME 302 is the termination point in the network for ciphering/integrity protection for NAS signaling and handles the security key management. Lawful interception of signaling is also supported by the MME 302. The MME 302 also provides the control plane function for mobility between LTE and 2G/3G access networks with the S3 interface terminating at the MME 302 from the SGSN (not shown). The MME 302 also terminates the S6a interface towards the home HSS 308 for roaming UEs.

The SGW 304 sits in the user plane where it forwards and routes packets to and from an eNodeB and PGW 306. The SGW 304 also serves as the local mobility anchor for inter-eNodeB handover and mobility between 3GPP networks. The SGW 304 routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW 306). For idle state UEs, the SGW 304 terminates the down link data path and triggers paging when down link data arrives for the UE. The SGW 304 manages and stores UE contexts, e.g. parameters of the IP bearer service and network internal routing information. The SGW 304 also performs replication of the user traffic in case of lawful interception.

The PGW 306 acts as the interface between the LTE network and other packet data networks, such as the Internet 116, SIP-based IMS network 118, and enterprise network 120. The PGW 306 serves as the anchor point for intra-3GPP network mobility, as well as mobility between 3GPP and non-3GPP networks. The PGW 306 acts as the Policy and Charging Enforcement Function (PCEF), which manages Quality of Service (QoS), online/offline flow-based charging data generation, deep-packet inspection, and lawful intercept. The PGW 306 provides connectivity to the UE to external packet data networks (PDNs) by being the point of exit and entry of traffic for the UE. A UE may have simultaneous connectivity with more than one PGW for accessing multiple PDNs. The PGW 306 performs policy enforcement, packet filtering for each user, charging support, lawful interception, and packet screening. The PGW 306 also provides an anchor for mobility between 3GPP and non-3GPP technologies such as WiMAX and 3GPP2 standards (CDMA 1X and EVDO).

The HSS 308 may be a master user database that supports IMS network entities that handle calls. The HSS 308 stores subscription-related information (subscriber profiles), performs authentication and authorization of the user, and can provide information about the subscriber's location and IP information. The HSS 308 also maintains binding information on which gateway is currently serving a UE. Even when the UE is detached from the network, the HSS 308 maintains the binding information until the UE re-attaches itself and updates the binding information. An HSS may sometimes be collocated with an Authentication, Authorization, and Accounting (AAA) server that can provide authentication, access control, and accounting to the network. The authentication can involve verification of the subscriber, the access control can involve granting or denying access to specific services, and the accounting can track the use of network resources by subscribers.

Policy and Charging Rules Function (PCRF) 310 may determine policy rules in the network. PCRF 310 may access subscriber databases and other specialized functions (e.g., a charging system) in a centralized manner. PCRF may support the creation of rules and policy decisions for each active subscriber on the network. PCRF may be integrated with one or more other components of core network 114 or may operate as a stand-alone entity.

The elements of core network 114 may include any suitable logic, such as one or more computer systems, network processing units, line cards, packet and voice processing cards, or other suitable logic.

Figure 4:
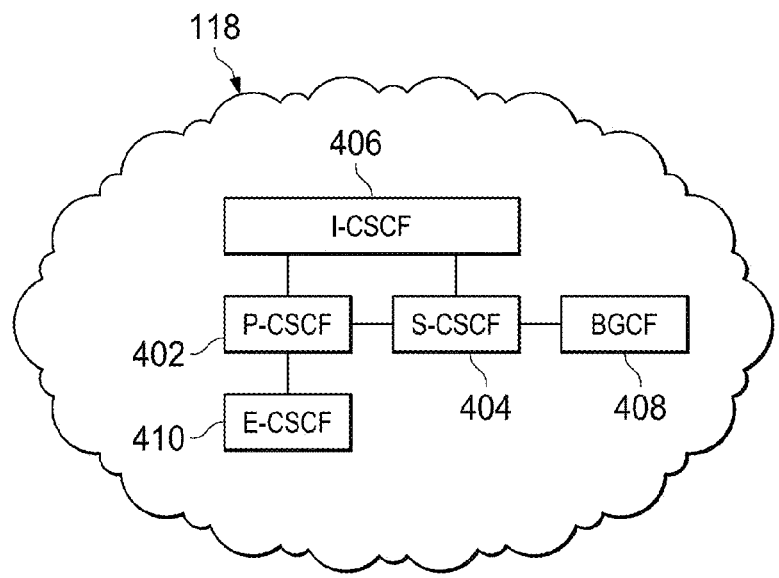
FIG. 4 illustrates an Internet Protocol Multimedia Subsystem (IMS) network in accordance with certain embodiments.

FIG. 4 illustrates an IMS network 118 in accordance with certain embodiments. In the embodiment depicted, IMS network 118 comprises Proxy Call Session Control Function (P-CSCF) 402, Serving Call Session Control Function (S-CSCF) 404, Interrogating Call Session Control Function (I-CSCF 406), Breakout Gateway Control Function (BGCF) 408, and Emergency Call Session Control Function E-CSCF 410. IMS network 118 may include any other suitable components in other embodiments.

P-CSCF 402 is the entry point to IMS network 118 and may serve as the outbound proxy server for a UE. A UE attaches to the P-CSCF 402 before performing IMS registrations and initiating SIP sessions. P-CSCF 402 may forward SIP messages to other elements of IMS network 118. For example, the P-CSCF 402 may route incoming SIP messages to an IMS registrar server hosted by S-CSCF 404. P-CSCF 402 may also generate charging data records (CDRs), maintain a security association with the UE (e.g., by setting up IPSec Security associations with UEs), may authorize bearer resource QoS via an Application Function toward PCRF 310, may facilitate the provision of local services (e.g., 411 or emergency calls), may provide lawful interception, may compress SIP headers, or perform any other suitable functions.

S-CSCF 404 may provide IMS user authentication for UEs. S-CSCF 404 may also act as an SIP registrar server. When a UE registers with the IMS network 118, S-CSCF 404 may load the user profile of the US from the HSS 308. The user profile may indicate which services (e.g., call forwarding, call forwarding when busy, ringback tone, etc.) the subscriber has. S-CSCF 404 may provide address translation support, may generate charging CDRs, and may provide lawful interception. The S-CSCF 404 may also facilitate the routing path for mobile originated or mobile terminated session requests.

I-CSCF 406 functions as an inbound SIP proxy server. During IMS registration by a UE, I-CSCF 406 may query the HSS to select the appropriate S-CSCF 404 to serve the UE. During an IMS session, I-CSCF 406 may function as the entry point to terminating session requests and may route incoming session requests to the S-CSCF of the called party. I-CSCF 406 may also generate charging CDRs and perform a Topology Hiding Function (THIG).

BGCF 408 is an SIP proxy which processes requests for routing from an S-CSCF when the S-CSCF has determined that the session cannot be routed using DNS. For example, BGCF 408 may perform routing based on a telephone number of the destination endpoint when the destination endpoint is attached to a public switched telephone network (PSTN).

E-CSCF 410 may receive SIP messages from the P-CSCF 402 when the P-CSCF determines the SIP messages are associated with an emergency call. The P-CSCF 402 may also send location data along with the SIP messages. The E-CSCF 410 may then route the call to a local Public Safety Access Point (e.g., a 911 Center).

The elements of IMS network 118 may include any suitable logic, such as one or more computer systems, network processing units, line cards, packet and voice processing cards, or other suitable logic.

As described earlier, router 108 may enable non-UICC SIP client devices 102 and non-UICC IMS client devices 104 to communicate with IMS network 118. Such features may be provided by a function of the router referred to herein as Voice over LTE-Mobile Router (VoLTE-MR). VoLTE-MR functionality may be provided by any suitable logic of router 108. VoLTE-MR may provide various functionalities for non-UICC SIP client devices 102 and non-UICC IMS client devices 104.

With respect to non-UICC SIP client devices 102, the VoLTE-MR may terminate SIP signaling from the non-UICC SIP client devices 102 attached to the mobile router 108 and for each SIP session from a client device 102 may initiate a corresponding IMS session to IMS network 118. The mobile router 108 may appear like a RFC-3261 compatible SIP Proxy server to client devices 102 and may appear like an IMS client to the IMS network 118. The VoLTE-MR function may attach to an Evolved Packet Core (e.g., network 114) to provide PDN connectivity to IMS network 118; perform bearer management for signaling and media sessions; manage IP Address and other configuration for the client devices 102; behave as an outbound proxy server for client devices 102; present client devices 102 as IMS hosts to the IMS network 118; and enable client devices 102 to interoperate with IMS Network 118 through signaling management (e.g., header modifications of SIP messages from client devices 102, insertion of additional SIP messages conforming to the IMS call flows), media management (e.g., performing transcoding services), and resource management (e.g., dedicated bearer setup and bearer management of IMS media and signaling traffic); provide failure handling & other services (e.g., PDN detach, bearer failure/drop, P-CSCF failure, re-authentication, de-registration from IMS network 118); and/or handle IMS message security for client devices 102. In one embodiment, the VoLTE-MR uses the UICC of the mobile router 108 to create a single PDN connection for IMS Access Point Name (APN) and allows the connection to be shared by any number of non-UICC SIP client devices 102 and non-UICC IMS client devices 104 coupled to the mobile router 108.

VoLTE-MR may participate in message handling on behalf of client devices 102 and IMS network 118. For example, client device 102 may send a normal RFC 3261 SIP Register message to an outbound proxy address matching the address of the VoLTE-MR. VoLTE-MR may modify the received Register message and send an IMS Compliant SIP Register message to IMS. The VoLTE-MR may also subscribe to a RegEvent Package on behalf of client device 102. VoLTE-MR may store the p-access-network info and p-associated-uri fields on behalf of the IMS subscriber. The p-associated-uri may contain an implicitly registered public user identity (PUI). If the VoLTE-MR receives a call for the p-associated-uri, the call will be forwarded to the client device 102. VoLTE-MR may also create transport mode IPSec security associations on behalf of client device 102.

With respect to non-UICC IMS client devices 104, VoLTE-MR may attach to network 114 (which in some embodiments is an EPC) to provide PDN connectivity to IMS network 118, perform bearer management for signaling and media sessions, manage IP Address and other configuration for the client devices 104, provide the IMS configuration to the client devices 104, and perform failure handling & other services (e.g., PDN detach, bearer failure/drop, P-CSCF Restoration, etc.).

In various embodiments, the VoLTE-MR does not modify the IMS signaling messages received from the client device 104, but rather routes the messages on the signaling bearer. IMS call signaling is tied to the Bearer Setup indication, however, for a non-UICC device such as client device 104 without a direct interface to the 3GPP network, there is no such indication present. Various embodiments may utilize DHCP/ND to deliver the Bearer Setup, Bearer Failure, and P-CSCF Restoration related events.

Figure 5:
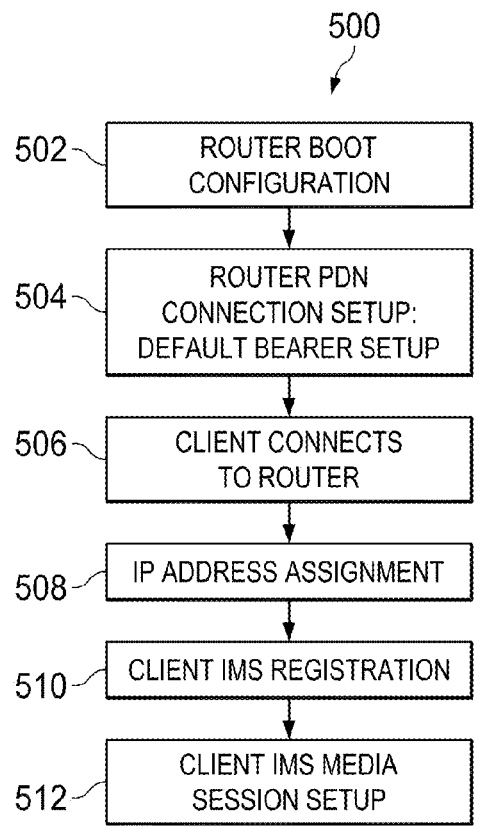
FIG. 5 illustrates a method for providing VoLTE support for non-UICC client devices attached to an LTE mobile router in accordance with certain embodiments.

FIG. 5 illustrates a method for providing VoLTE support for non-UICC client devices 102 and 104 attached to an LTE mobile router 108 in accordance with certain embodiments. At step 502, router boot configuration is performed. The router 108 may boot up by reading a configuration file stored in memory of the router. As part of the bootup, the router 108 may activate a radio link to the LTE access network 110 based on identification and configuration information stored on a UICC 226 of the router.

At step 504, the router 108 initiates a PDN connection setup to the LTE core network 114 and a default bearer setup. The router 108 may be configured with a default APN for the PDN connection or a trigger received from a client device 102 or 104 may prompt the router 108 to connect to a particular APN. If no APN is provided by the router to the core network 114, the MME may connect to a default APN based on the s6a interface.

The default bearer may establish a logical connection for a data flow which may be used to carry IMS control signaling between the IMS network 118 and the router 108. The default bearer may be associated with an IP address of the router 108. The default bearer may be associated with a set of network parameters that describe how data transferred using the default bearer will be treated. For example, a default bearer might receive best effort traffic delivery. All non-UICC client devices 102 and 104 sitting behind the router 108 share the same default bearer for SIP signaling. For example, all IMS control messages sent between the router 108 and IMS network 118 on behalf of client devices 102 and 104 may use the default bearer. The default bearer setup procedure is described in more detail in connection with FIG. 29. During the default bearer setup, router 108 receives an IP address and QoS policies, among other information.

At step 506, a client device 102 or 104 is connected to router 108. The client device may be connected in any suitable manner, such as through a wired connection (e.g., an Ethernet cord) or a wireless connection. The router may perform local authentication on the client device 102, to ensure that the router does not provide services to rogue devices. At step 508, the router assigns the client device an IP address. In one embodiment, a local address may be assigned by the router 108 to each non-UICC client device 102 and 104 and the router may perform network address translation (NAT) based on prefixes received from the router's PDN connection. For example, the IP prefixes configured on the ingress interfaces of the router 108 may be private addresses (e.g., in accordance with RFC1918 or RFC4193 Unique Local Addresses). The client devices 102 and 104 attached to the router 108 (or specific VLAN/interface of the router) will be able to obtain address configuration from these delegated prefixes, using standard IPv6 ND/DHCP. NAT/PAT functions will be enabled on the ingress interface, thus there will be translation between the private IP space and the IP address obtained for the PDN connection.

In another embodiment, the non-UICC client devices 102 and 104 may each be assigned an IPv6 prefix using DHCP-PD. For example, the IP prefixes configured on the ingress interfaces of the router 108 may be the delegated prefixes obtained from the LTE core network 114. After completing the PDN connection/default-bearer establishment on the IMS APN, the router 108 will use DHCP PD for obtaining delegated mobile network prefixes (e.g., by using the Rel-10 Prefix Delegation feature). These prefixes will be dynamically configured on the ingress interface of the router 108. The client devices 102 and 104 attached to the router 108 (or specific VLAN/interface of the router) will be able to obtain address configuration from these delegated prefixes, by using standard IPv6 ND/DHCP for address configuration.

At step 510, the client device registers with the IMS network 118. During this step the client device may provide its identity and IP address to the IMS network 118. A client device may be assigned IMS subscription information (e.g., Home Domain, IPSec security keys) including an IMS Private User Identity (IMPI) and one or more IMS Public User Identities (IMPUs) by an IMS service provider. An IMPI may be assigned by the home network operator as a unique identity for the IMS subscription and may be authenticated during IMS registration by the client device. An IMPI is normally in the form of NAI@realm and is included in all registration/re-registration/de-registration requests. An IMPU is a public identity used by any user for requesting communications with other users. An IMPU is not authenticated during registration and may be in the form of a SIP URI (e.g., SIP:user@domain.com) or a telco URI (e.g., Tel:+18001234567). In some embodiments, multiple IMPUs with different service profiles may be associated with a single IMPI. If a client is a non-UICC SIP client device 102, during this step it may provide a SIP public user identity (e.g., SIP URI) and SIP private user identity (e.g., username) to the mobile router 108. Upon receiving a request from a client, the mobile router 108 may identify the subscriber based on an SIP URI (or IMPU if client is capable of IMS compliant messaging) of the client and use security credentials associated with the subscriber to modify messages sent to the IMS network 118.

After the client device is registered to the IMS network, it can use media services provided by the network (e.g., to initiate or receive calls). As long as the client devices remains registered to the IMS network, it can make or receive any number of calls (i.e., participate in any number of media sessions).

At step 512, an IMS media session is setup between the client device and the IMS network 118. During setup and during the media session itself, a client device 102 will use SIP signaling (e.g., as defined in RFC 3261) in its communications with mobile router 108 and a client device 104 will use IMS signaling in its communications with mobile router 108. This signaling will be described below in connection with additional figures.

Some of the steps illustrated in FIG. 5 may be repeated, combined, modified or deleted where appropriate, and additional steps may also be included. Additionally, steps may be performed in any suitable order without departing from the scope of particular embodiments.

Figure 6:
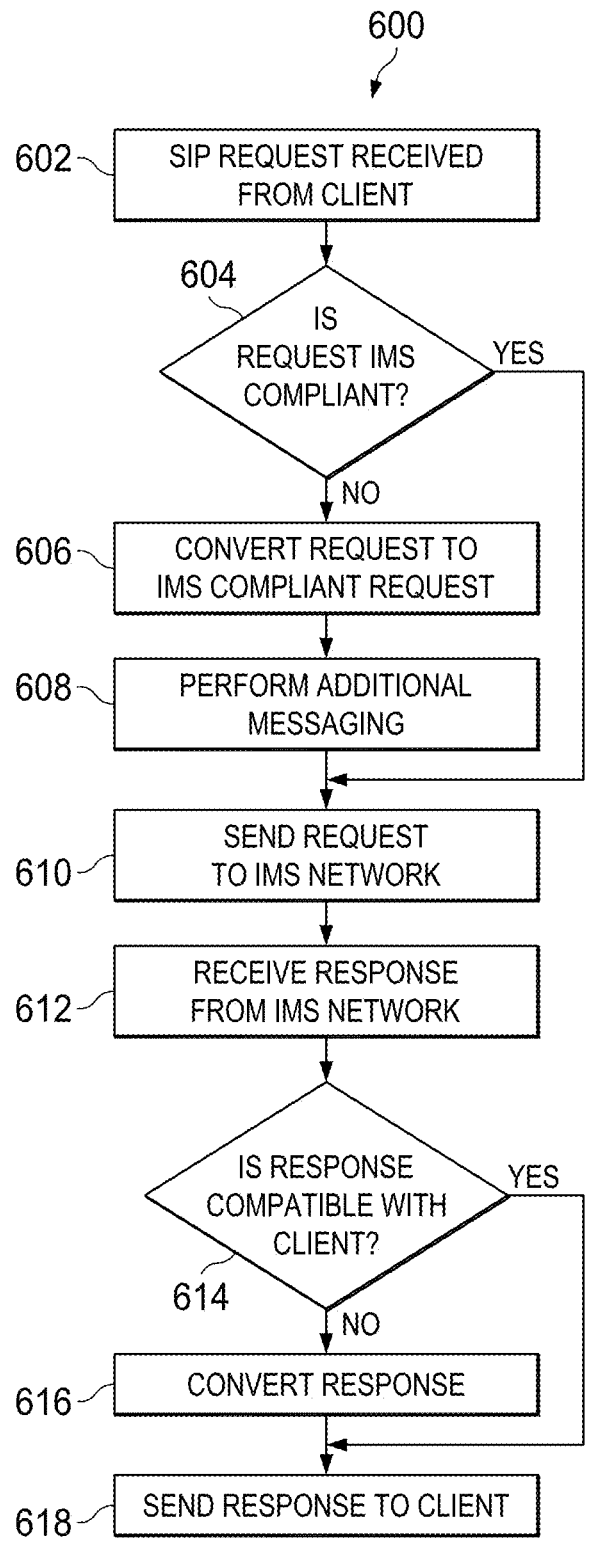
FIG. 6 illustrates an example method for communicating with non-UICC client devices and an IMS network in accordance with certain embodiments.

FIG. 6 illustrates an example method 600 for communicating with non-UICC client devices 102 and 104 and an IMS network 118 in accordance with certain embodiments. The steps of method 600 may be performed by any suitable device, such as router 108. At step 602, a SIP request is received from a client device 102 or 104. The SIP request may be a standard SIP request from client device 102 that is compliant with RFC 3261 but is not compliant with IMS (e.g., is not compliant with TS 23.228 and TS 24.229), or it may be a SIP request sent from client device 104 that is compliant with both RFC 3261 and IMS. At step 604, it is determined whether the request is IMS compliant. For example, if the request is received from a non-UICC SIP client device 102, the router may judge the request to be non-compliant with IMS, whereas if the request is received from a non-UICC IMS client device 104, the router may judge the message to be compliant. In other embodiments, the router may look at the headers or payload of the request to determine whether the request is IMS compliant. If the request is IMS compliant, the request is sent without modification to the IMS network 118 at step 610. If it is not, the request is converted to an IMS compliant request at step 606. In various embodiments, this may involve adding one or more headers to the message, adding additional SIP messages, transcoding media data, or performing resource management (e.g., making sure that guaranteed bitrate requirements are met on behalf of the client devices 102 and 104) associated with the request. With respect to transcoding media data, media data received from client devices 102 may be transcoded by the router 108 into IMS compliant media data for IMS network 118 and vice versa. For example, media data coming from or going to a non-UICC SIP client may be encoded by a G711 ALaw Media codec while media data coming from or going to the IMS network may be encoded by an AMR Media codec. At various points during communication, additional messaging may be performed at step 608 by the router 108 (e.g., the router may send proxy acknowledgment or update messages to the IMS network on behalf of the client device 102). The modified request is then sent to IMS network 118 at step 610.

At step 612, a response destined for a client device 102 or 104 from the IMS network 118 is received. At step 614, it is determined whether the response is compatible with the client device 102 or 104 that the response is addressed to. In general, the response may contain SIP messaging that is IMS compliant. Accordingly, if the response is for a non-UICC IMS client device 104, it may be determined that the response is compatible with the client device 104 and may be sent to the client device at step 618. However, if the response is for a non-UICC SIP client device 102, it may be determined that the response is not compatible with the client device 102 and the response may be converted to standard SIP signaling at step 616. In some instances, step 616 may also involve transcoding of media data to a format that is compatible with client device 102. At step 618, the response is delivered to the client device 102. In various embodiments, after the media session is complete, a media session tear down procedure may be performed wherein the mobile router modifies a SIP tear down message received from client device 102 to be IMS compliant.

Some of the steps illustrated in FIG. 6 may be repeated, combined, modified or deleted where appropriate, and additional steps may also be included. Additionally, steps may be performed in any suitable order without departing from the scope of particular embodiments.

The remaining figures depict detailed call flows for various messages that may be sent between components of system 100.

Figure 7:
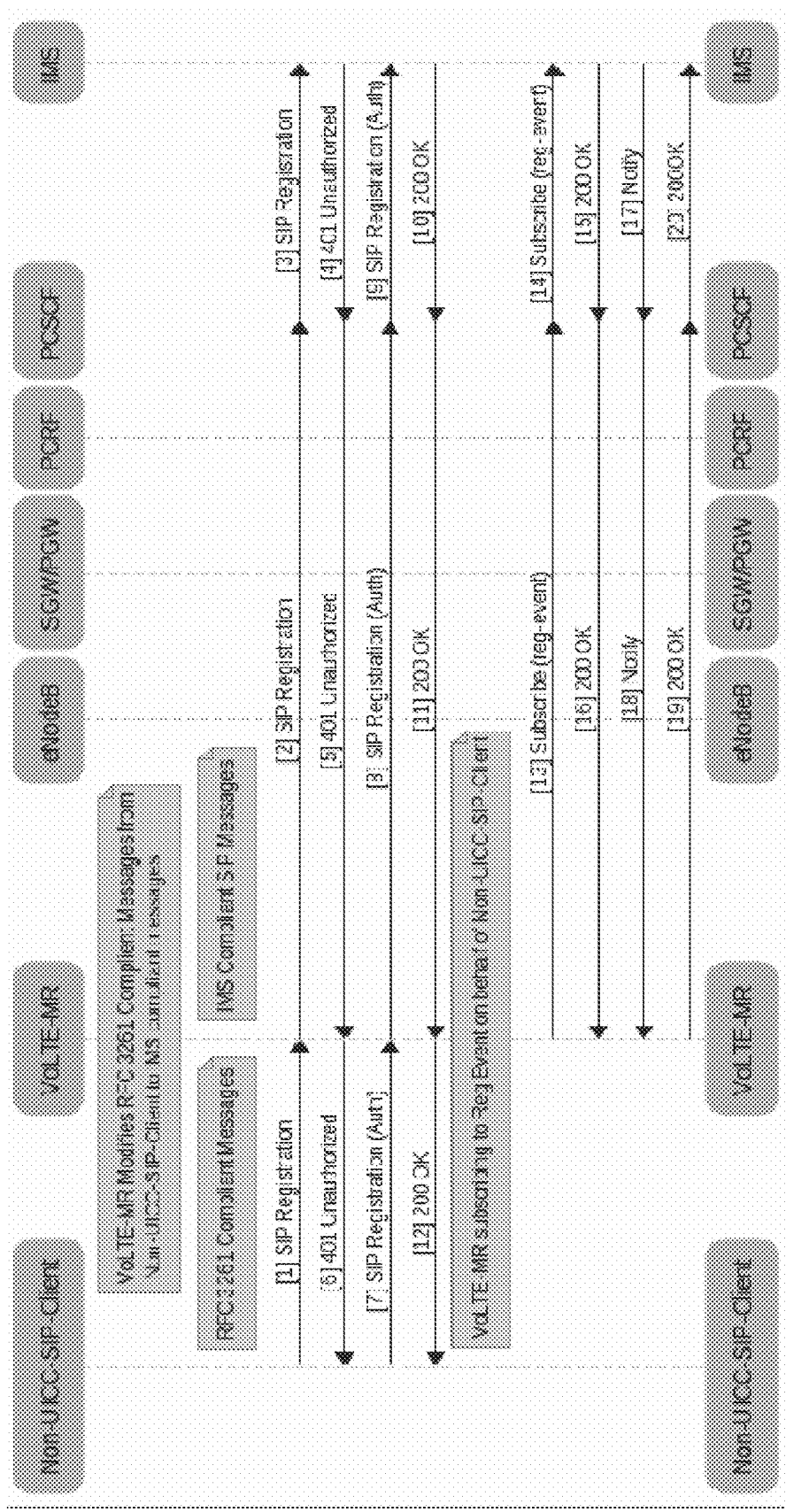
FIG. 7 illustrates an example IMS registration procedure that may be performed for a non-UICC SIP client device in accordance with certain embodiments.

FIG. 7 illustrates an example IMS registration procedure that may be performed for a non-UICC SIP client device 102 in accordance with certain embodiments. In various embodiments, mobile router 108 may perform an IMS registration process for each client device 102 of any number of client devices. Messages 1-10 may comprise messages for performing IMS registration on behalf of the client device 102 while messages 13-20 comprise messages for subscribing to Registration Events on behalf of the client device 102.

In the embodiment depicted, client device 102 send a SIP Registration message to the router 108. The router converts the SIP Registration message into an IMS compliant SIP Registration message and sends the converted message to the P-CSCF, which then sends it to one or more nodes in the IMS network 118. The IMS network 118 may then challenge the client device with a 401 unauthorized message. In response, the client device 102 will send another SIP Registration message with the necessary authentication information. The IMS network will then authenticate the client device 102 and send a 200 OK message back to the client device 102.

The router then subscribes with the IMS network for notifications of events (e.g., registration, re-registration, deregistration events). Thus, if an event occurs, the IMS network will notify router 108. Under RFC 3261 or RFC 3665 (which describes basic SIP call flows for RFC 3261 compliant devices), such registration by the SIP client is not required and thus a device 102 might not include registration capability.

Figure 8:
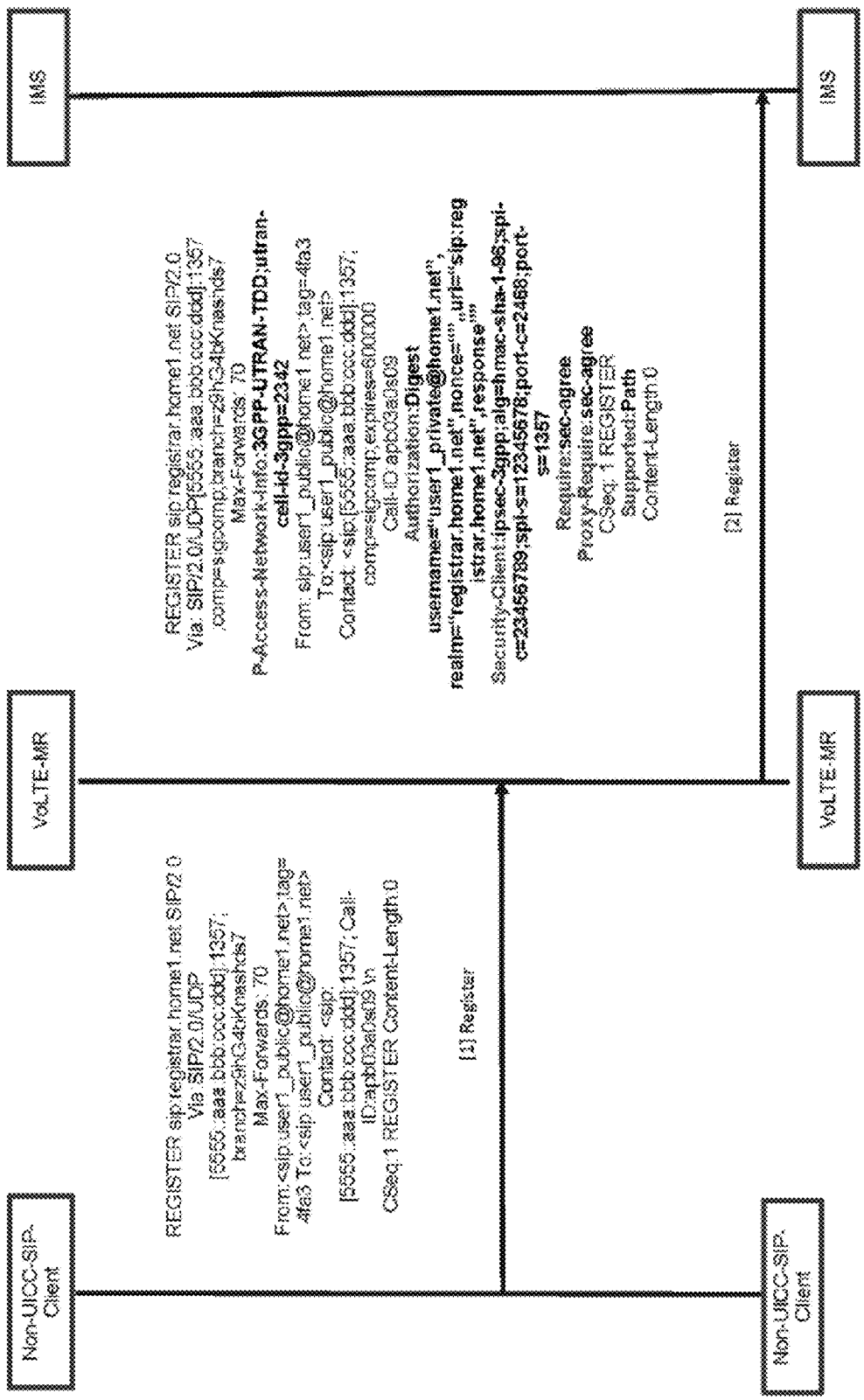
FIGS. 8-11 illustrates example messages of the IMS registration procedure of FIG. 7 in accordance with certain embodiments.
Figure 9:
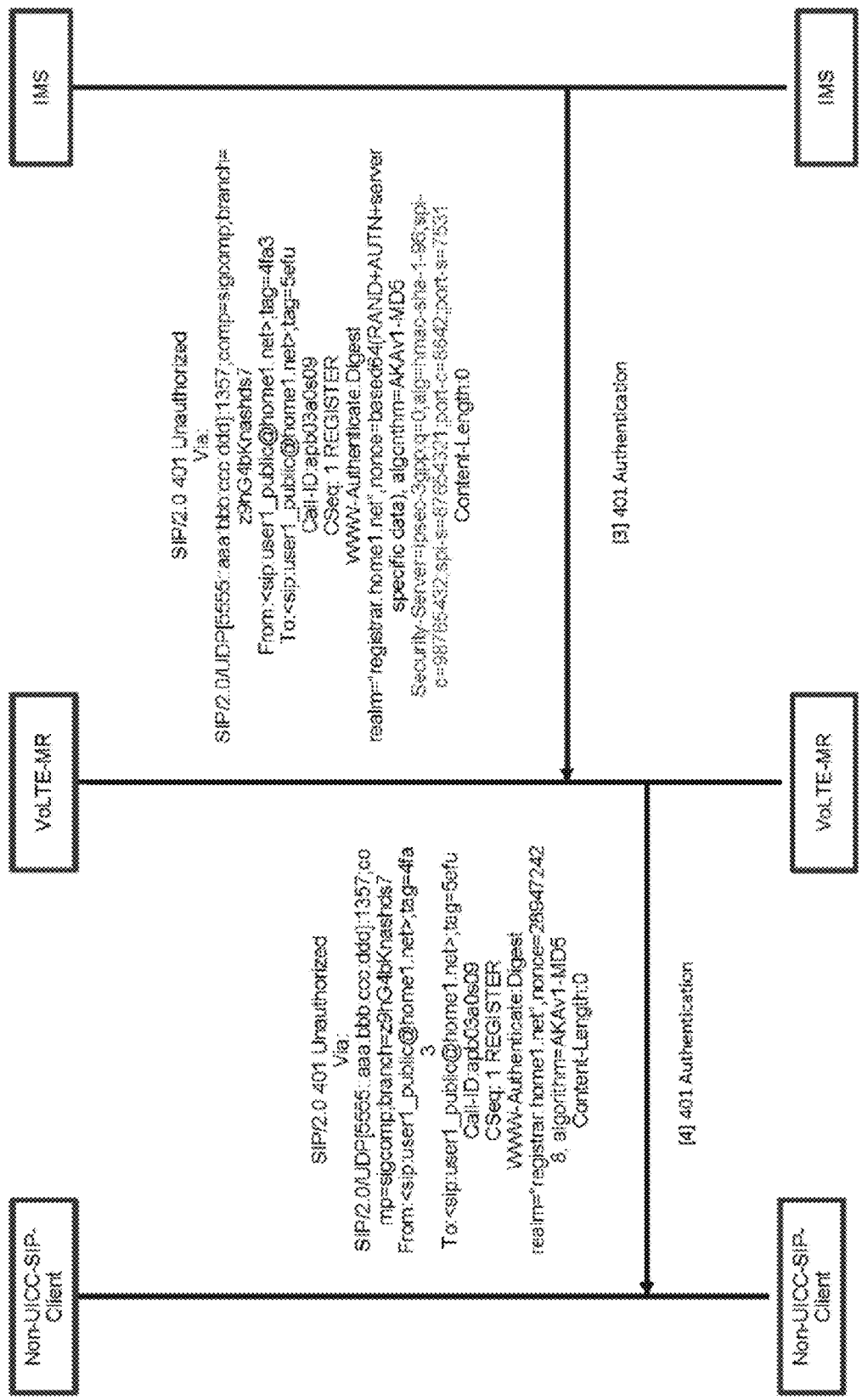
Figure 10:
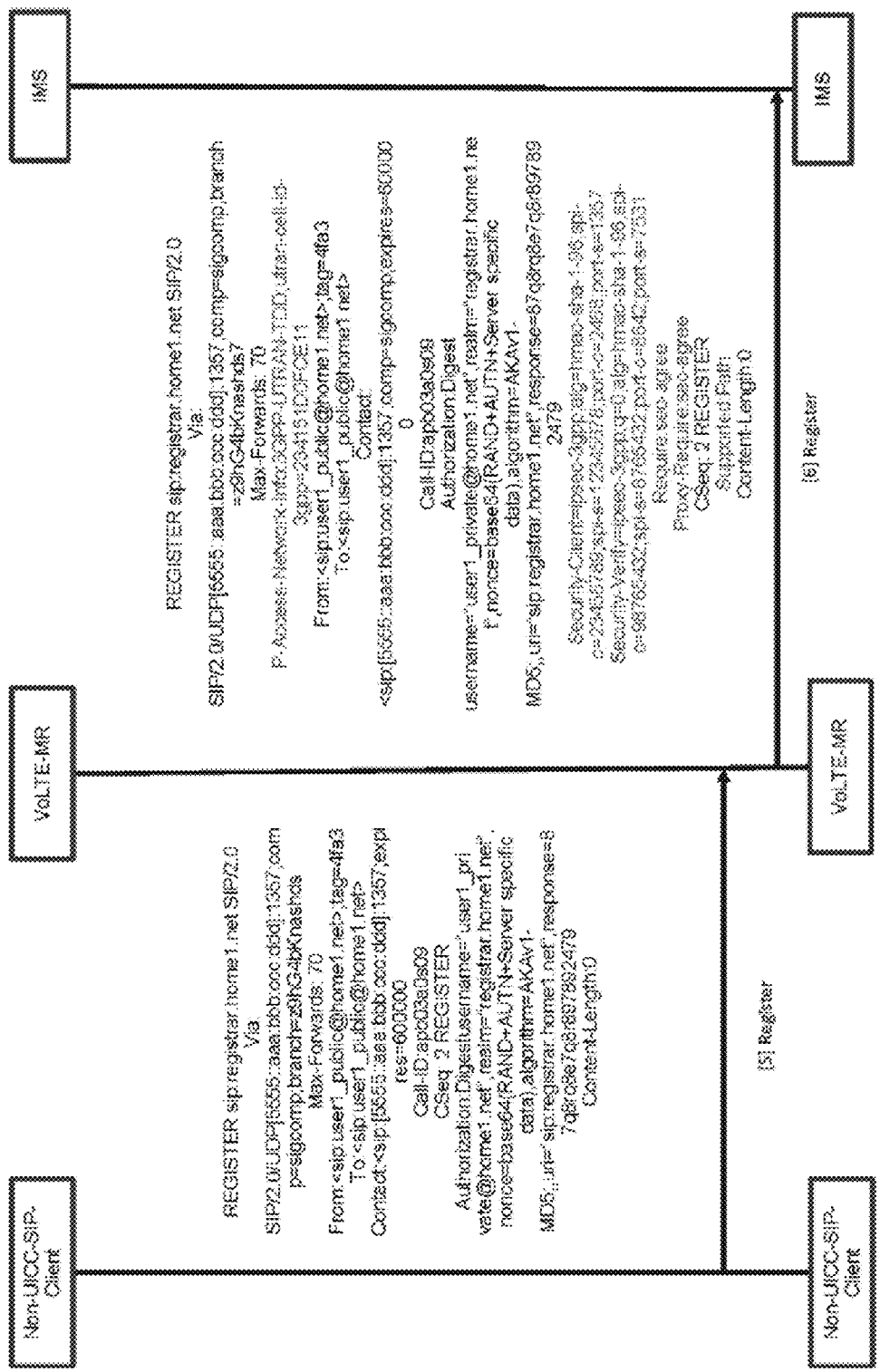
Figure 11:
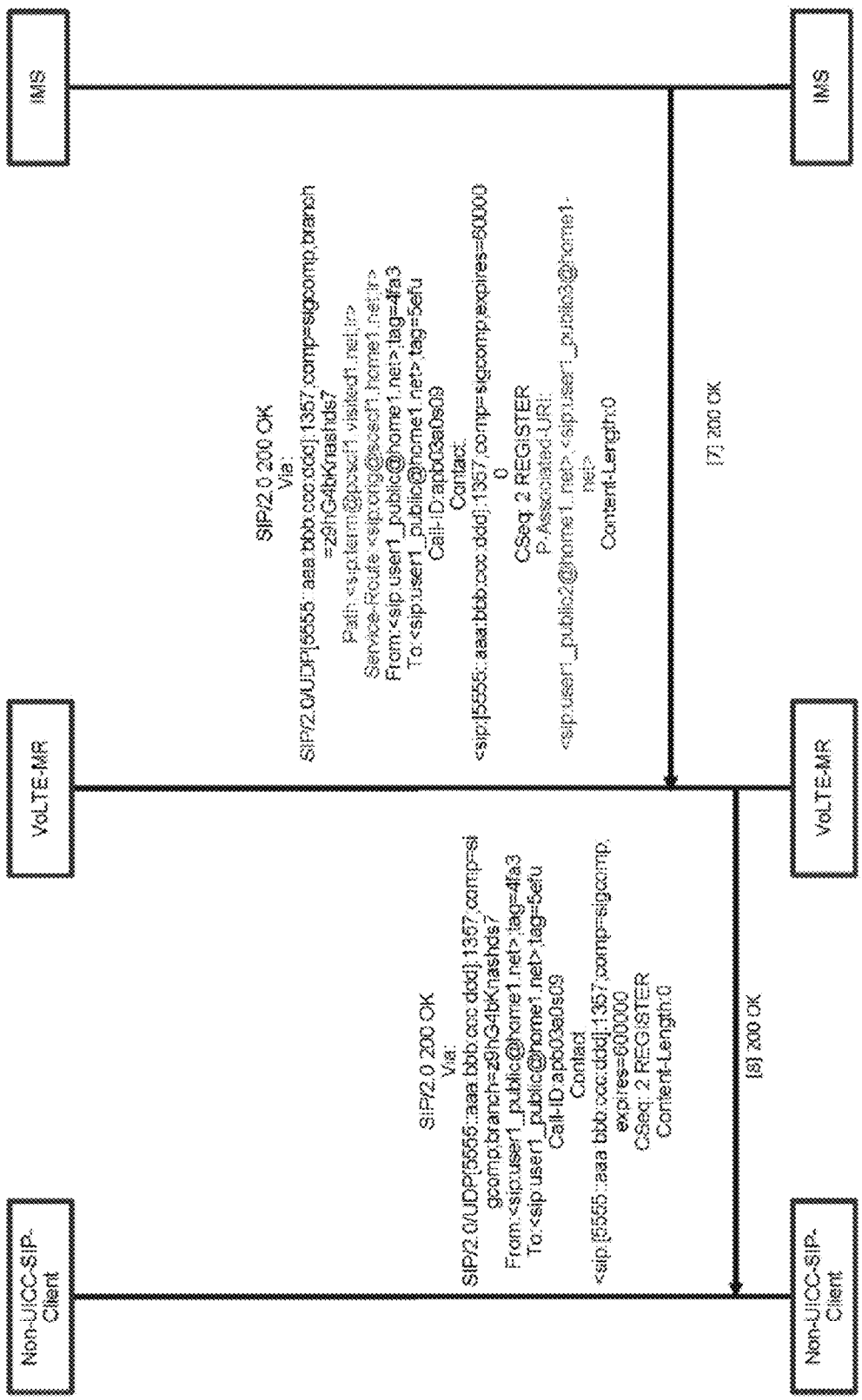

FIGS. 8-11 illustrates example messages of the IMS registration procedure of FIG. 7 in accordance with certain embodiments. The various components of the messages shown in the call flows herein may be understood by reference to the appropriate SIP specification (e.g., RFC 3261 and other RFCs as accessible via http://www.iana.ore-assignments/sip-parameters/sip-parameters.xhtml). As depicted in FIG. 8, the Register message sent from the client device may include various headers and accompanying information indicating the entity (i.e., client device 102) that is requesting IMS registration (e.g., the public user identity or SIP URI of client device 102 in connection with the "From" header), the IP address of the entity requesting IMS registration, and the server at the IMS network which it would like to be registered to. The modified Register message sent from router 108 to IMS network 118 may include additional information (e.g., packet access network information, authorization information, security information) making the modified Register message IMS compatible. In various embodiments, some of the additional information in the modified Register message (e.g., the security information) is obtained from the UICC of the router 108 (e.g., if the negotiated authentication mode is SIM based authentication (e.g., EAP-SIM/EAP-AKA) then the mobile router 108 will obtain the security credentials from its UICC). The packet access network information may specify the access network type (e.g., UTRAN) and cell in which the router is located. The authorization information may include identity information of the router (e.g., a SIP username of the router (i.e., user1_private@home1.net)), the realm (domain in which the user may be validated), and the URI of the registrar server that will perform validation of the username. The security information includes information used to establish a secure connection for the SIP signaling between the IMS network 118 and the router 108 (e.g., using the IPSec protocol). In the 401 authentication message sent back to the client device 102, the router 108 may strip out security information as depicted in FIG. 9. In response to the 401 authentication message, the client device 102 will send a register message with an authorization header (including the private user identity or username of the client device 102) and accompanying information. The authorization information may also include a realm or other suitable information. The router 108 may add additional headers and send the modified register message to the IMS network 118. The IMS network may then send a 200 OK and router may strip out various information (such as a P-CSCF identifier indicating the P-CSCF to which future requests should be sent, a S-CSCF identifier indicating the S-CSCF that will process the calls, and a P-Associated-URI indicating all the aliases (e.g., IMPUs) with which client device 102 may access the IMS network 118).

Figure 12:
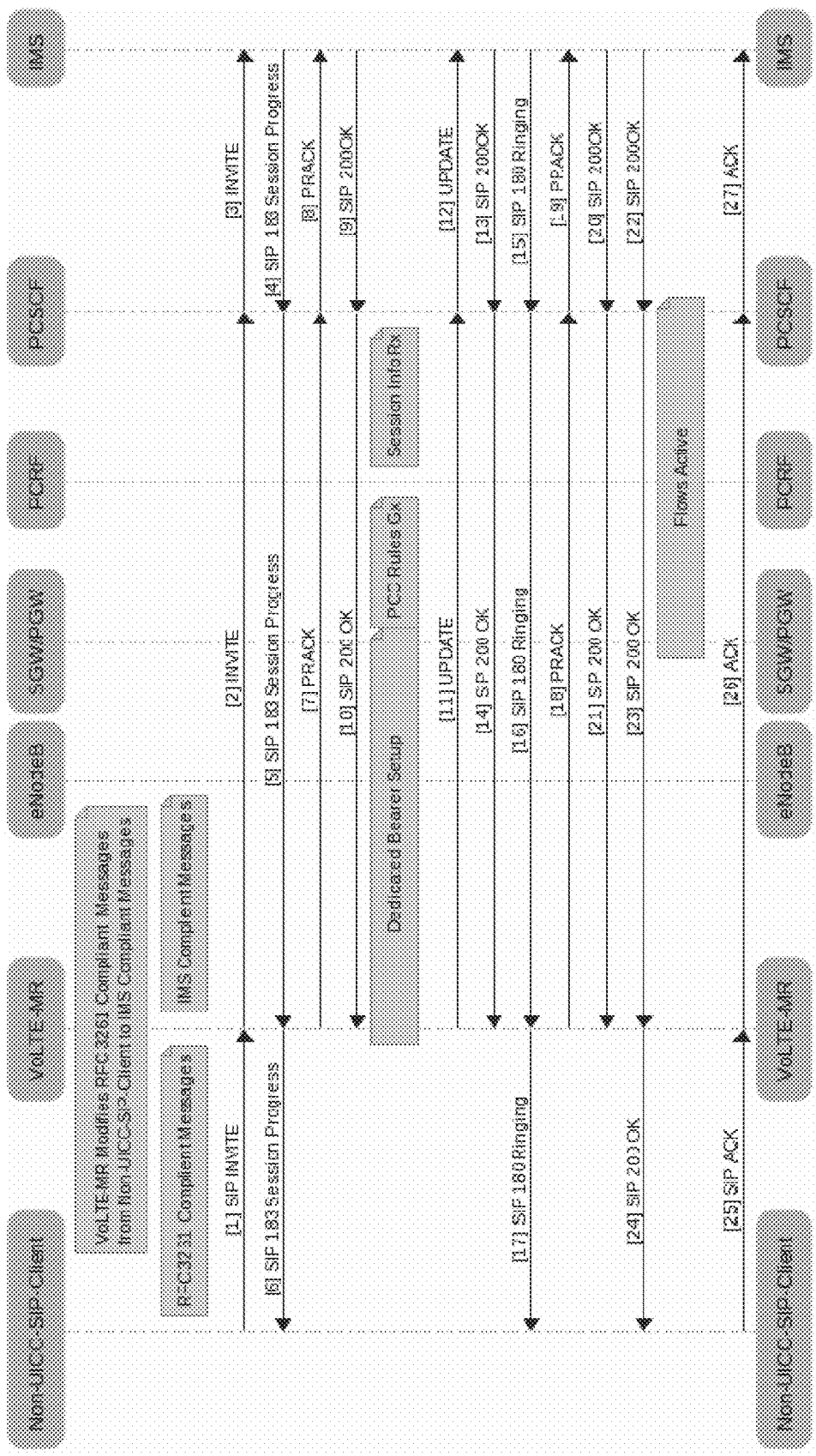
FIG. 12 illustrates an example SIP media session between a non-UICC SIP client device and an IMS network in accordance with certain embodiments.
Figure 13:
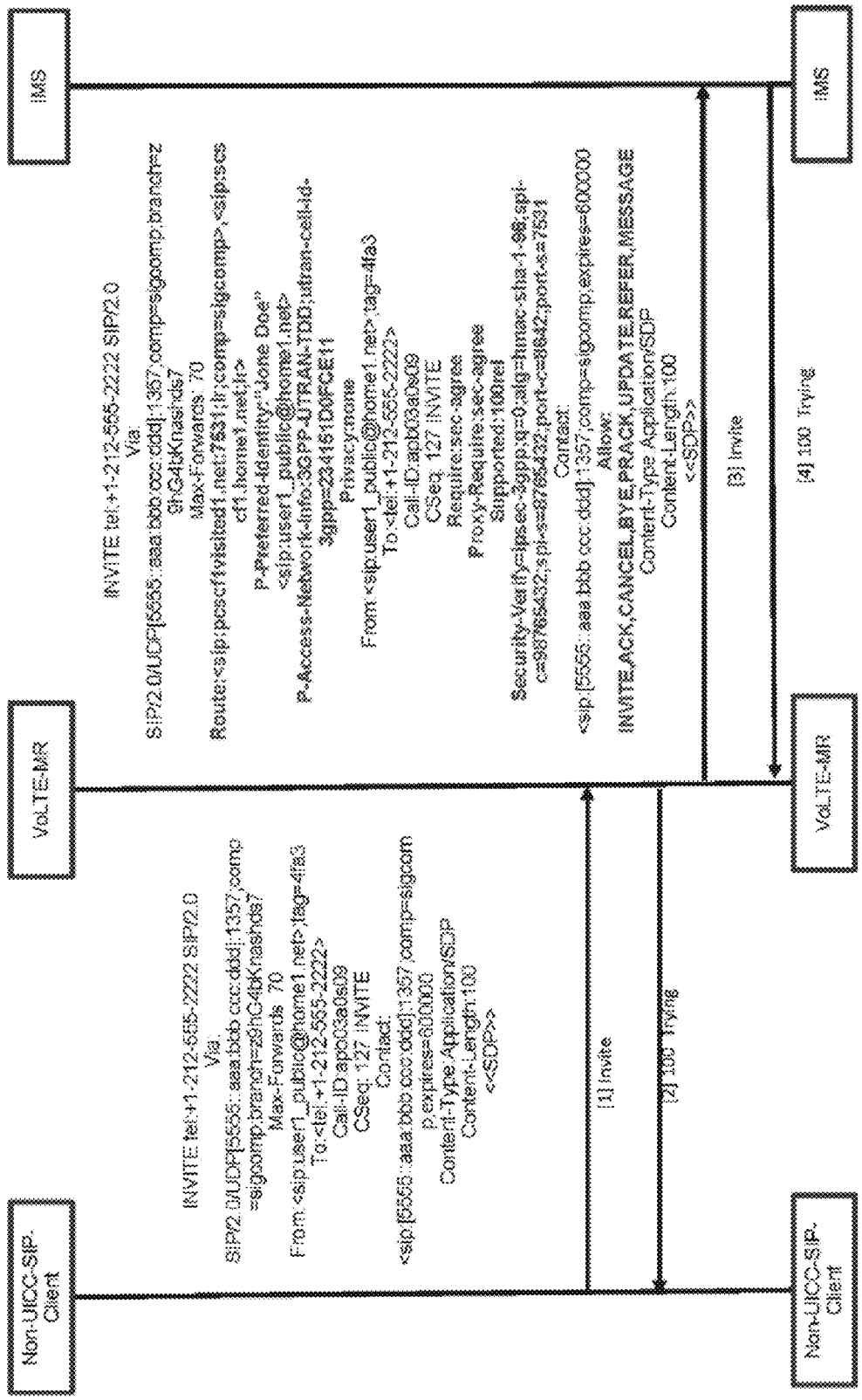
FIGS. 13-20 illustrates example messages of the example SIP media session of FIG. 12 in accordance with certain embodiments.
Figure 14:
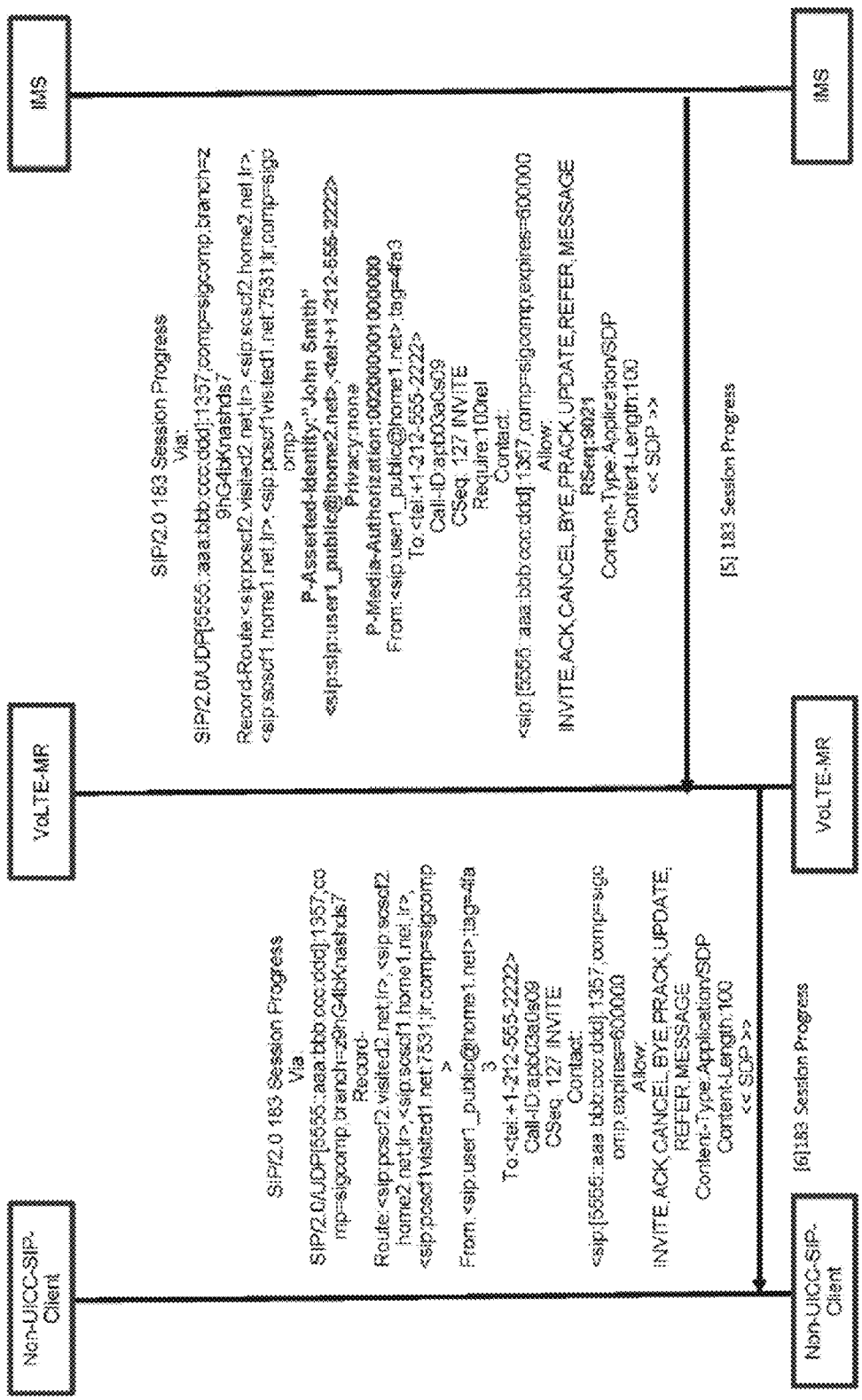
Figure 15:
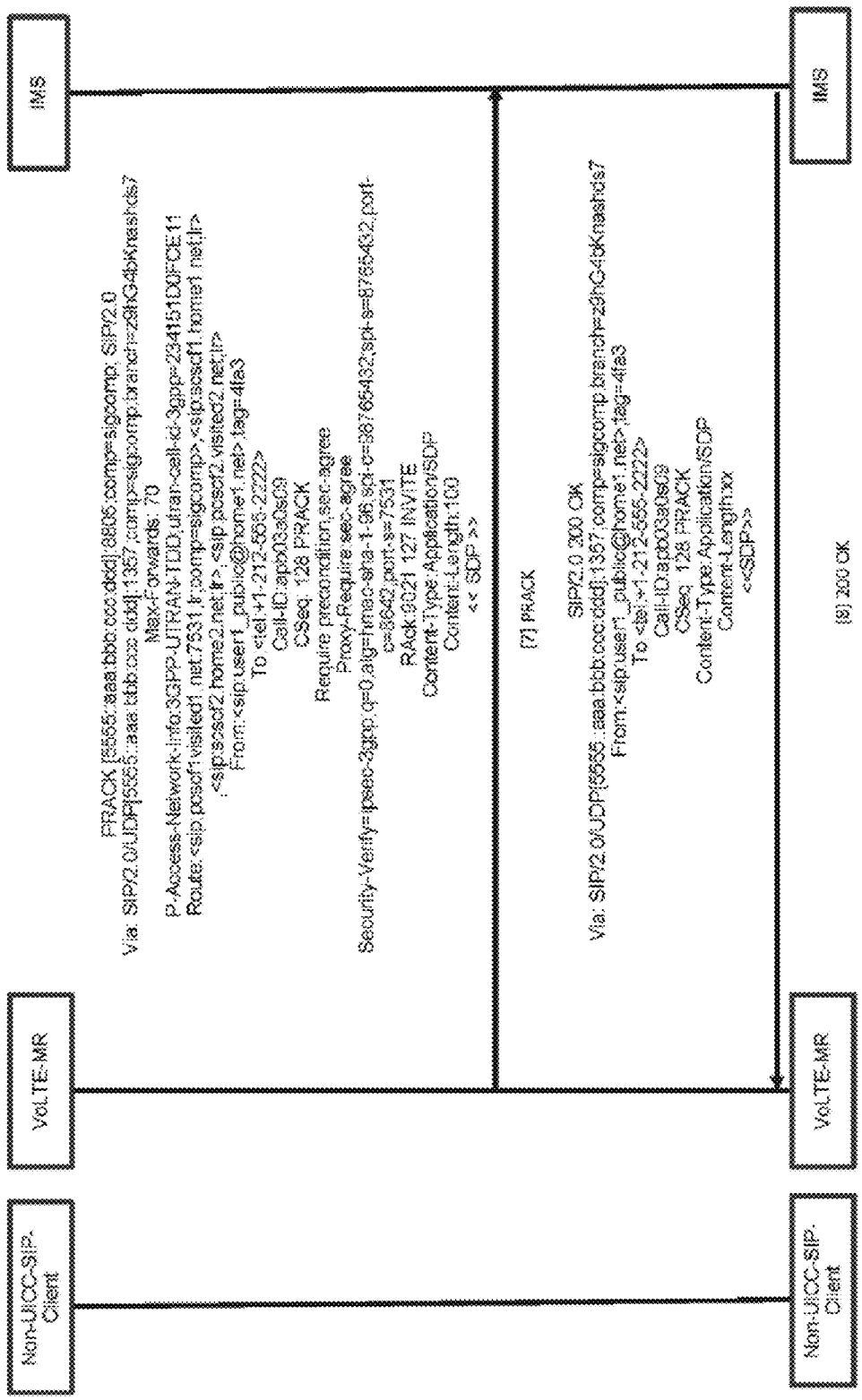
Figure 16:
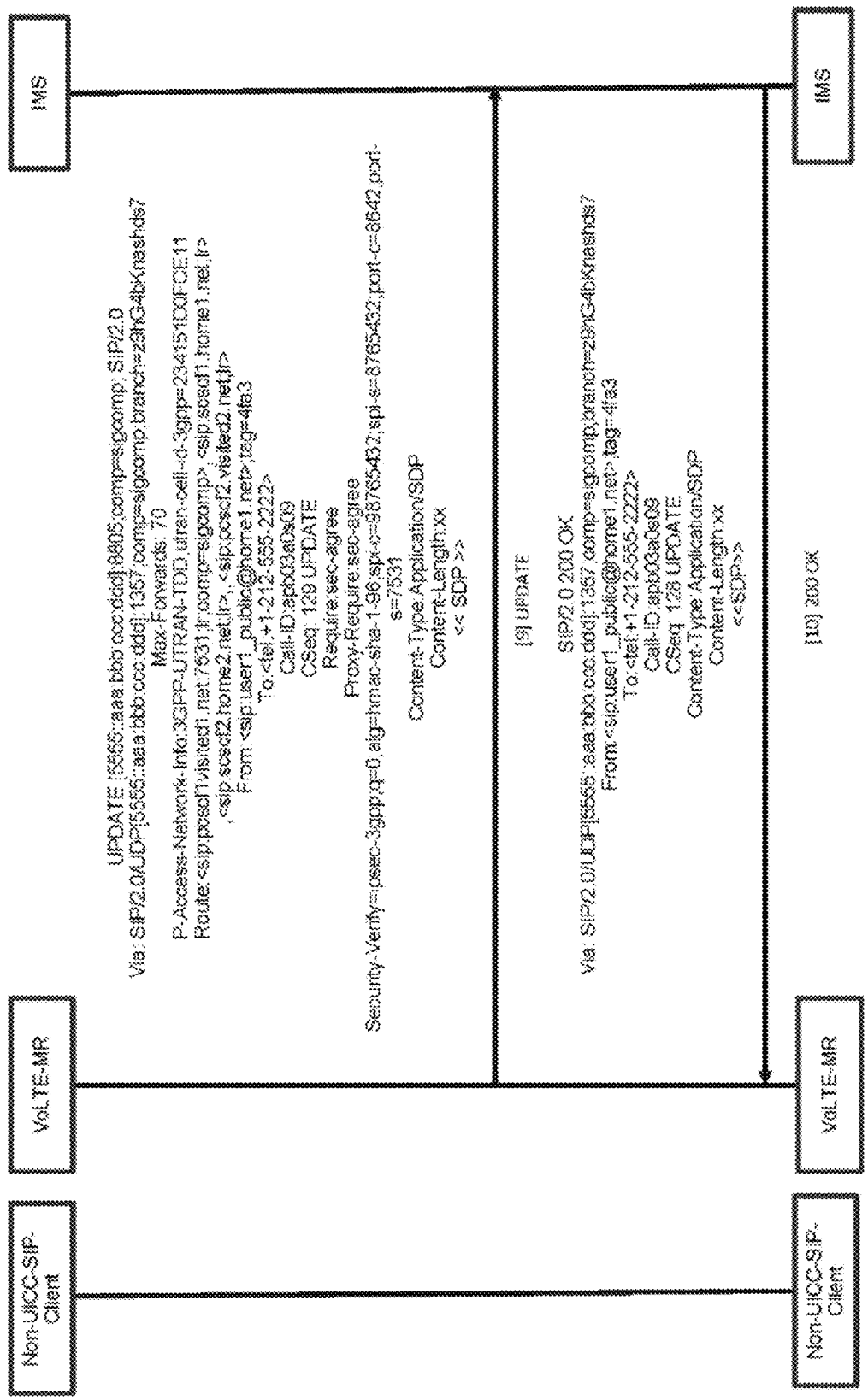
Figure 17:
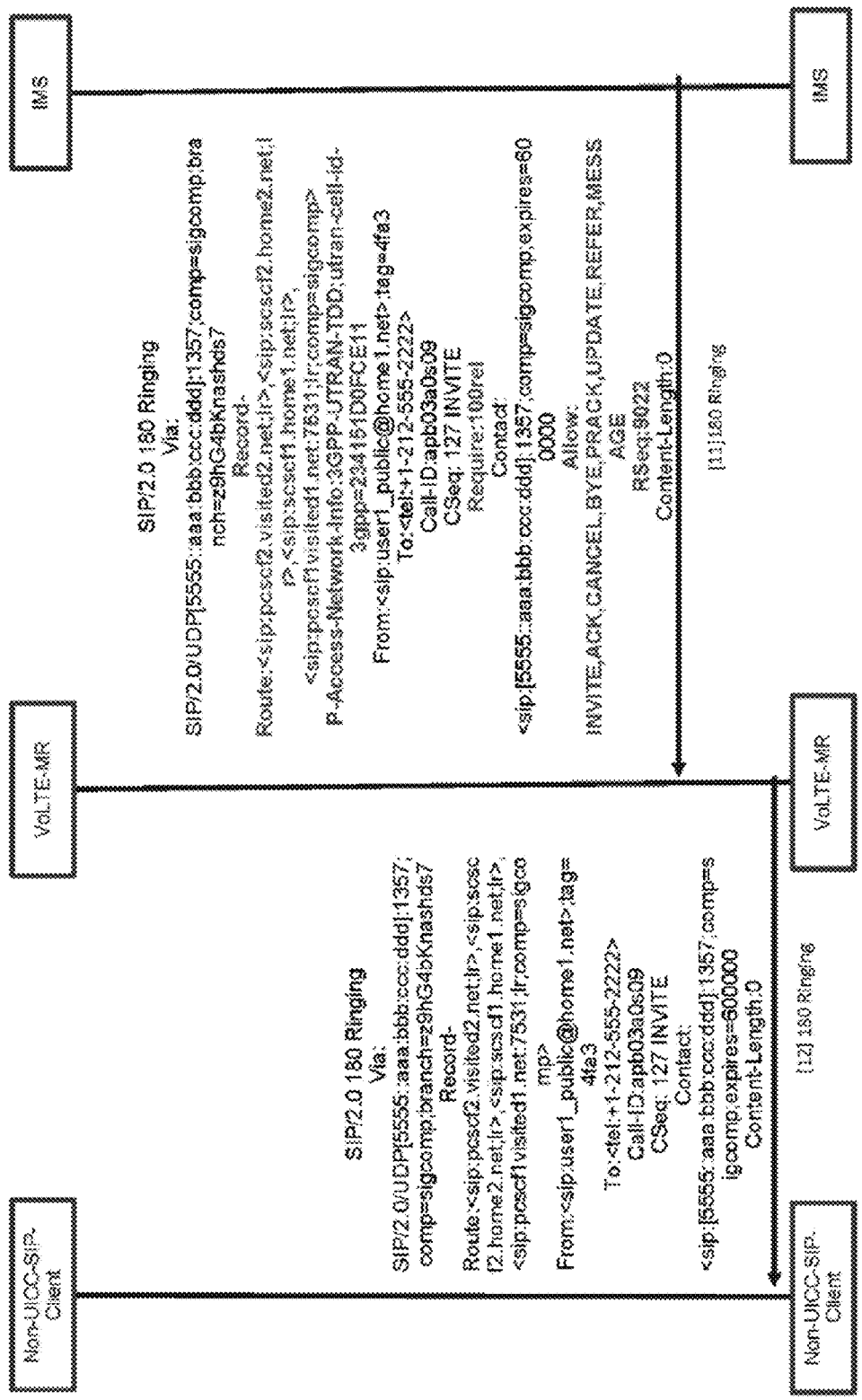
Figure 18:
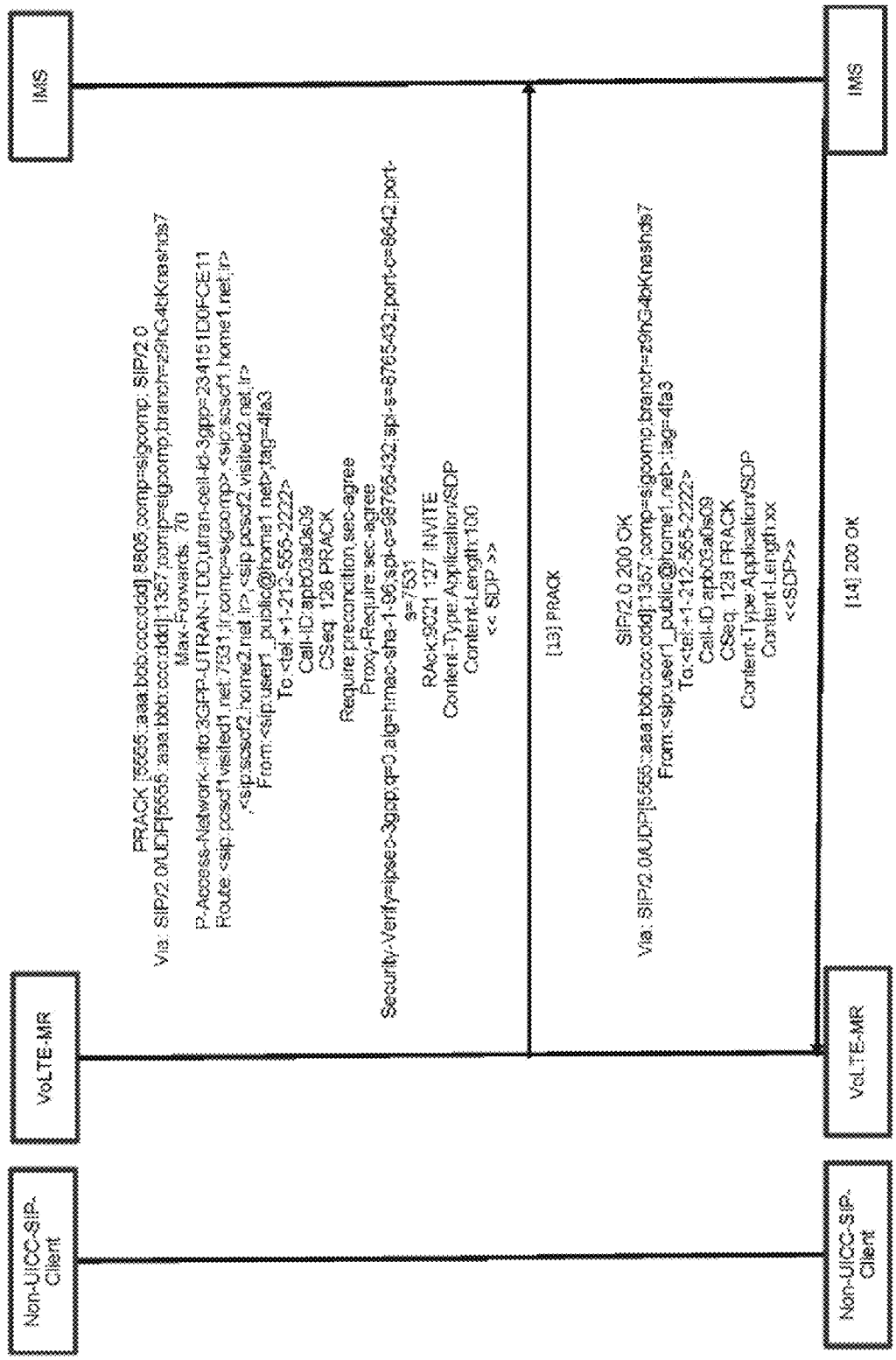
Figure 19:
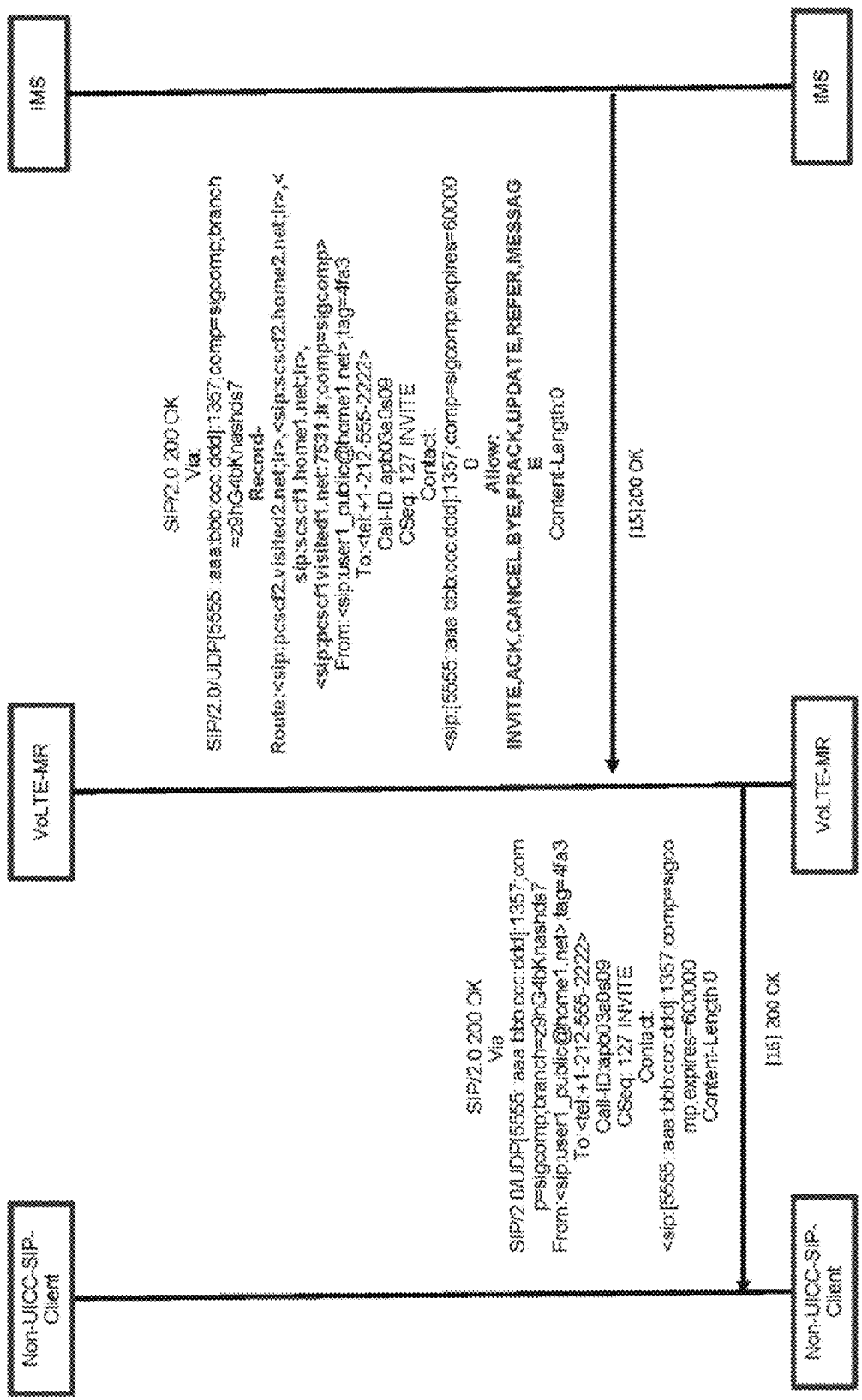
Figure 20:
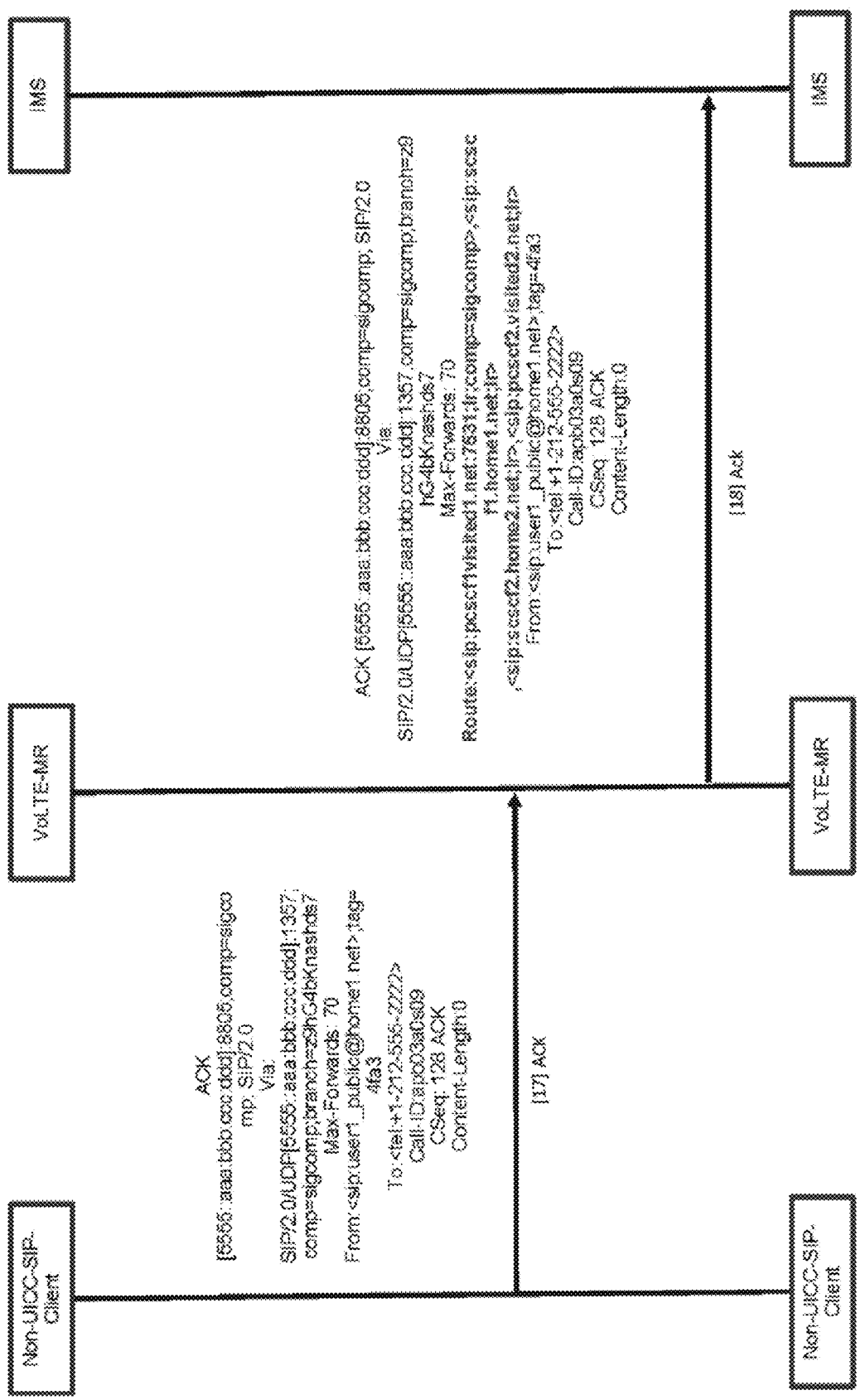

FIG. 12 illustrates an example SIP media session between a non-UICC SIP client device and an IMS network in accordance with certain embodiments. The SIP media session may involve the transfer of voice, the transfer of other media (e.g., video), or a combination thereof. The SIP media session may take place after the IMS registration procedure has been performed.

In the SIP Invite message sent by the client device 102, the client device will specify the called party. The router 108 will modify this message to be IMS compliant and then send it towards the IMS network 118. The IMS network 118 then sends a session progress message back indicating that it is currently processing the SIP Invite request.

A non-UICC SIP client device 102 may or may not have support for sending the Proxy Acknowledgement message, so in the embodiment depicted, the router 108 will send the Proxy Acknowledgement message to the IMS network 118. The IMS network will then respond with a SIP 200 OK message.

The router then sets up a dedicated bearer. The dedicated bearer may establish a logical connection for a data flow which may be used to carry media information (e.g., voice or video traffic) associated with a particular SIP call (as opposed to the default bearer which is used to carry the control signaling for the SIP sessions). The dedicated bearer may reserve a particular bandwidth for the session based on a QoS value associated with the session (e.g., higher bandwidths may be reserved for premium subscribers) which may be obtained from the PCRF or other suitable source. A dedicated bearer may provide a dedicated tunnel for specific traffic and may be associated with the default bearer (and thus does not need its own IP address). In particular embodiments, a dedicated bearer may be shared by any suitable number of client devices 102 and 104 to carry traffic for SIP sessions involving the client devices. After the dedicated bearer is setup, the router sends an UPDATE message to the IMS network 118 indicating that bandwidth for the call has been reserved. The IMS network 118 will then ring the destination phone and send a notification of the ringing back to the client device 102. The router 108 will send a proxy acknowledgement message to the IMS network 118 in response to the notification of the ringing. Once the destination endpoint answers the call, the IMS network sends a 200 OK message to the client device 102 and the flow becomes active. An acknowledgement message will be sent from the client device 102 to the IMS network 118 and the media session will begin. FIGS. 13-20 illustrates example messages of the example SIP media session of FIG. 12 in accordance with certain embodiments.

Figure 21:
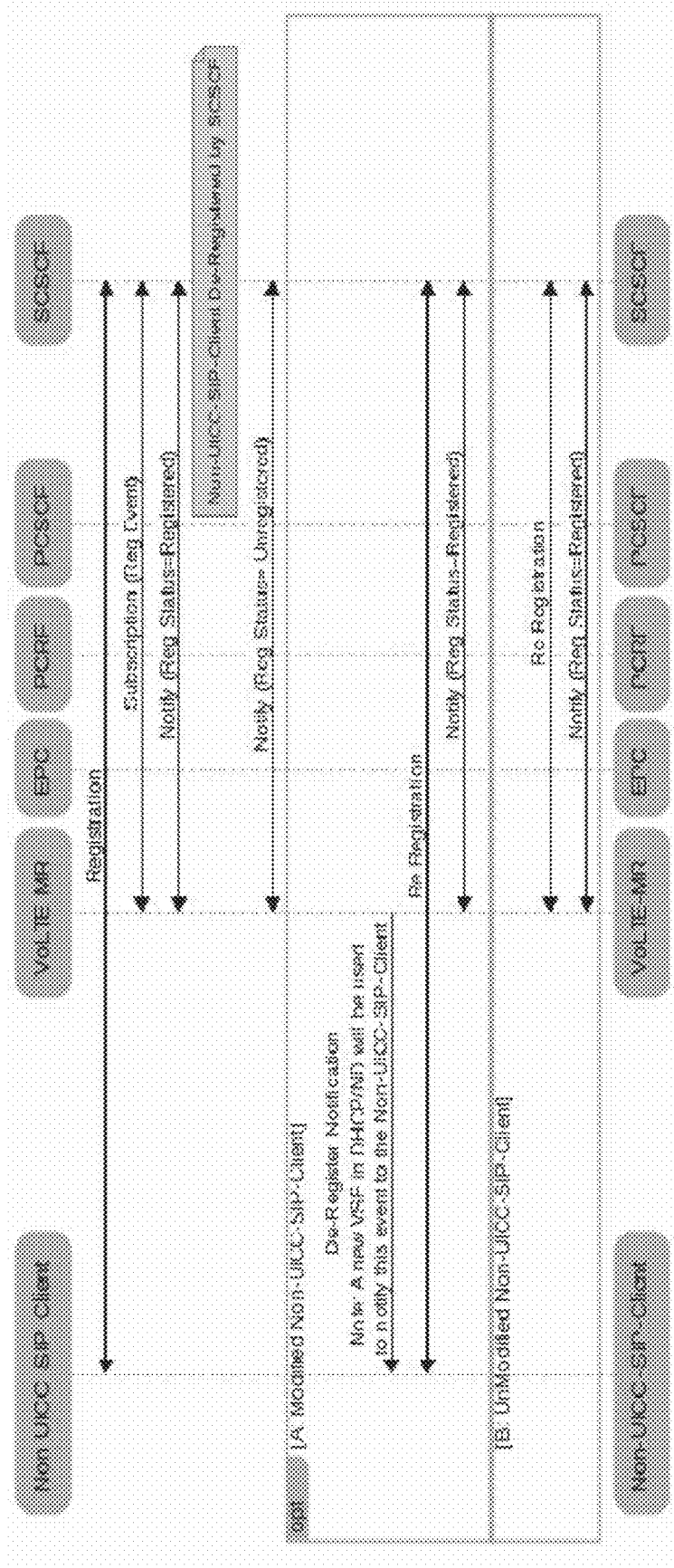
FIG. 21 illustrates an example network initiated de-register procedure performed with respect to a non-UICC SIP client device in accordance with certain embodiments.

FIG. 21 illustrates an example network initiated deregister procedure performed with respect to a non-UICC SIP client device 102 in accordance with certain embodiments. The example call flow may occur when the IMS deregisters client device 102 from the IMS network 118 thus preventing client device 102 from making or receiving calls. In one embodiment, the router 108 may notify the client device 102 that it has been de-registered from the IMS network via a new vendor specific extension (VSE) information element and the client device 102 may re-register. In another embodiment, the router 108 may automatically re-register with the IMS network on behalf of the client device 102 without requiring and messaging from the client device 102.

Figure 22:
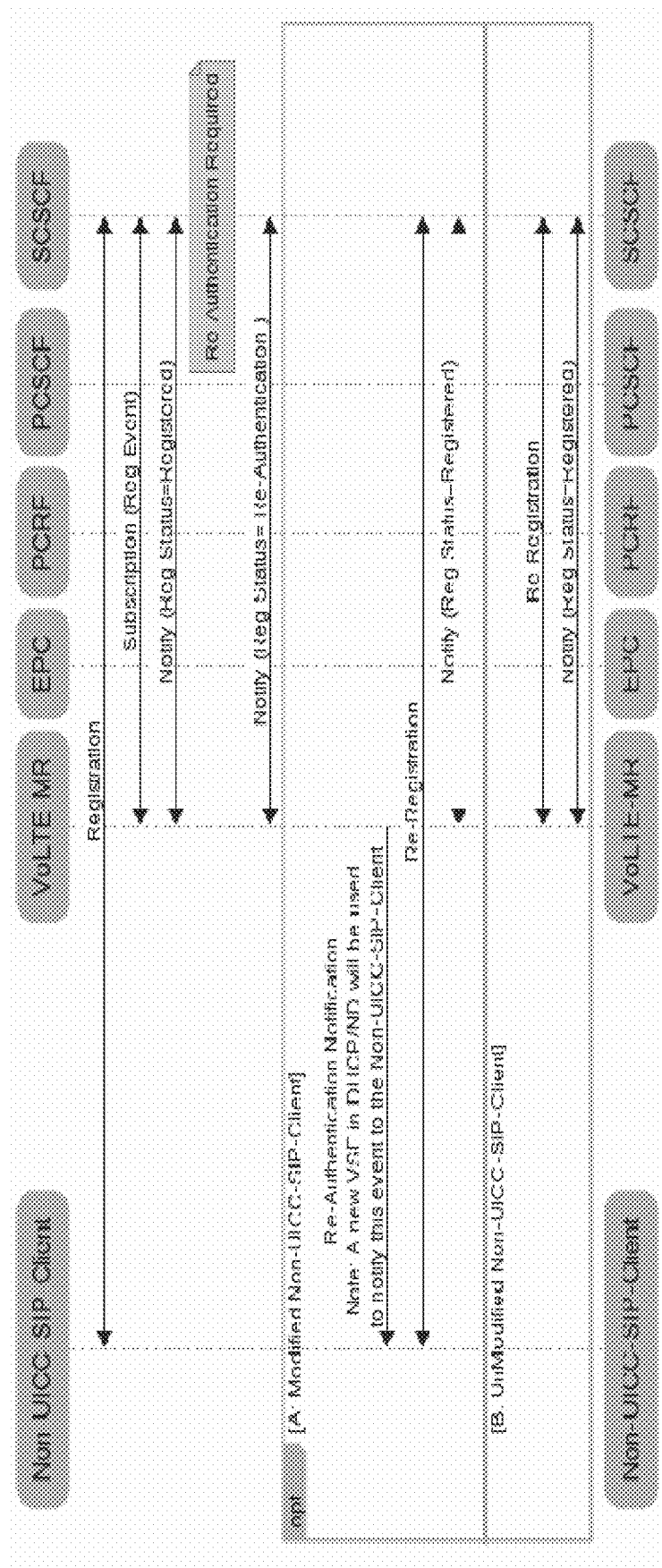
FIG. 22 illustrates an example network initiated re-authorization procedure performed with respect to a non-UICC SIP client device in accordance with certain embodiments.

FIG. 22 illustrates an example network initiated re-authorization procedure performed with respect to a non-UICC SIP client device 102 in accordance with certain embodiments. Similar to the flow shown in FIG. 21, in one embodiment, the router 108 may notify the client device 102 that re-authentication is required via a new vendor specific extension (VSE) information element and the client device 102 may re-register. In another embodiment, the router 108 may automatically re-register with the IMS network on behalf of the client device 102 without requiring any messaging from the client device 102.

Figure 23:
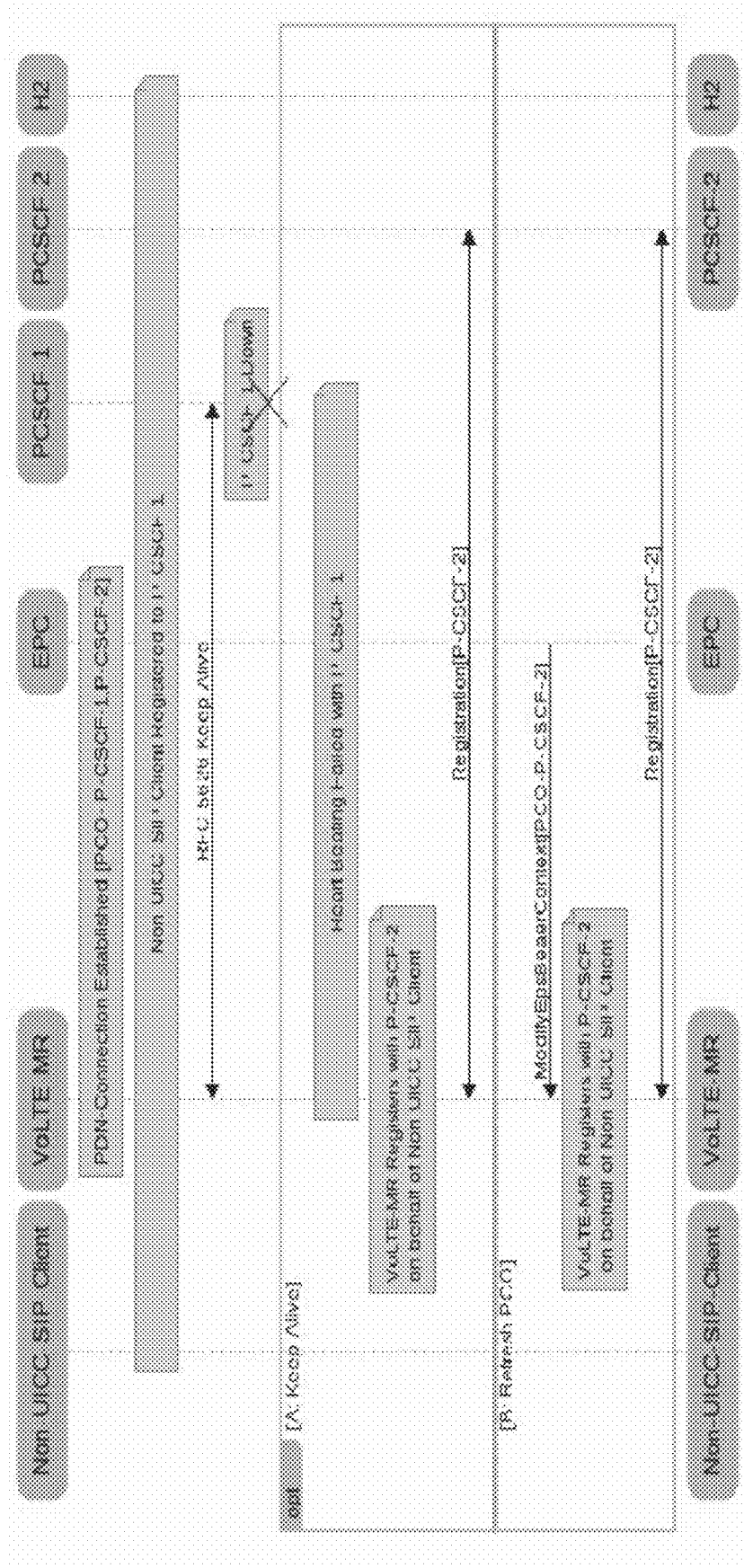
FIG. 23 illustrates an example P-CSCF restoration procedure performed with respect to a non-UICC SIP client device in accordance with certain embodiments.

FIG. 23 illustrates an example P-CSCF restoration procedure performed with respect to a non-UICC SIP client device 102 in accordance with certain embodiments. In this flow, the router 108 may register with a different P-CSCF of the IMS network 118 if the original P-CSCF fails.

Figure 24:
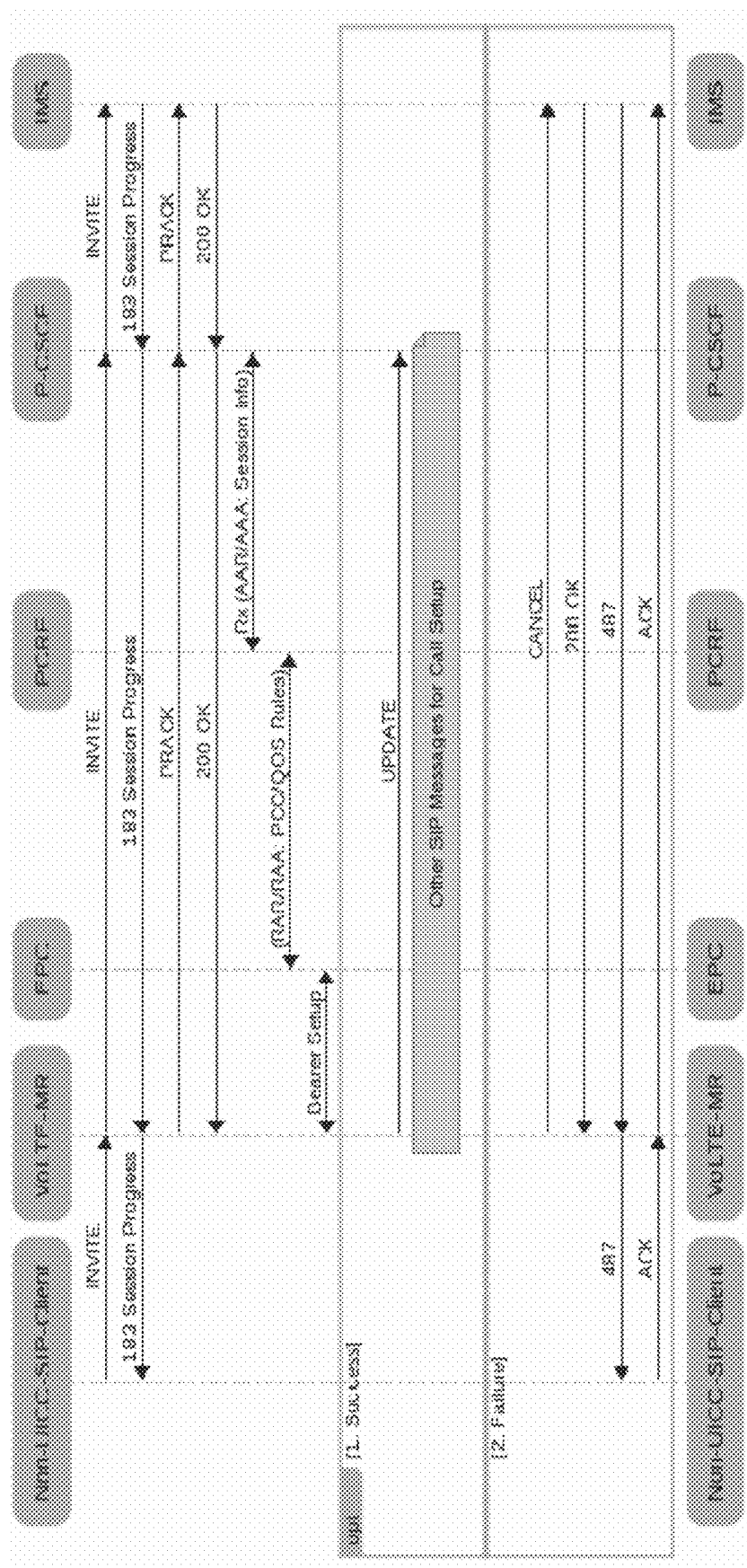
FIG. 24 illustrates an example call flow involving a resource reservation failure with respect to a non-UICC SIP client device in accordance with certain embodiments.

FIG. 24 illustrates an example call flow involving a resource reservation failure with respect to a non-UICC SIP client device 102 in accordance with certain embodiments. For example, if the dedicated bearer setup fails, router 108 may disconnect the call.

Figure 25:
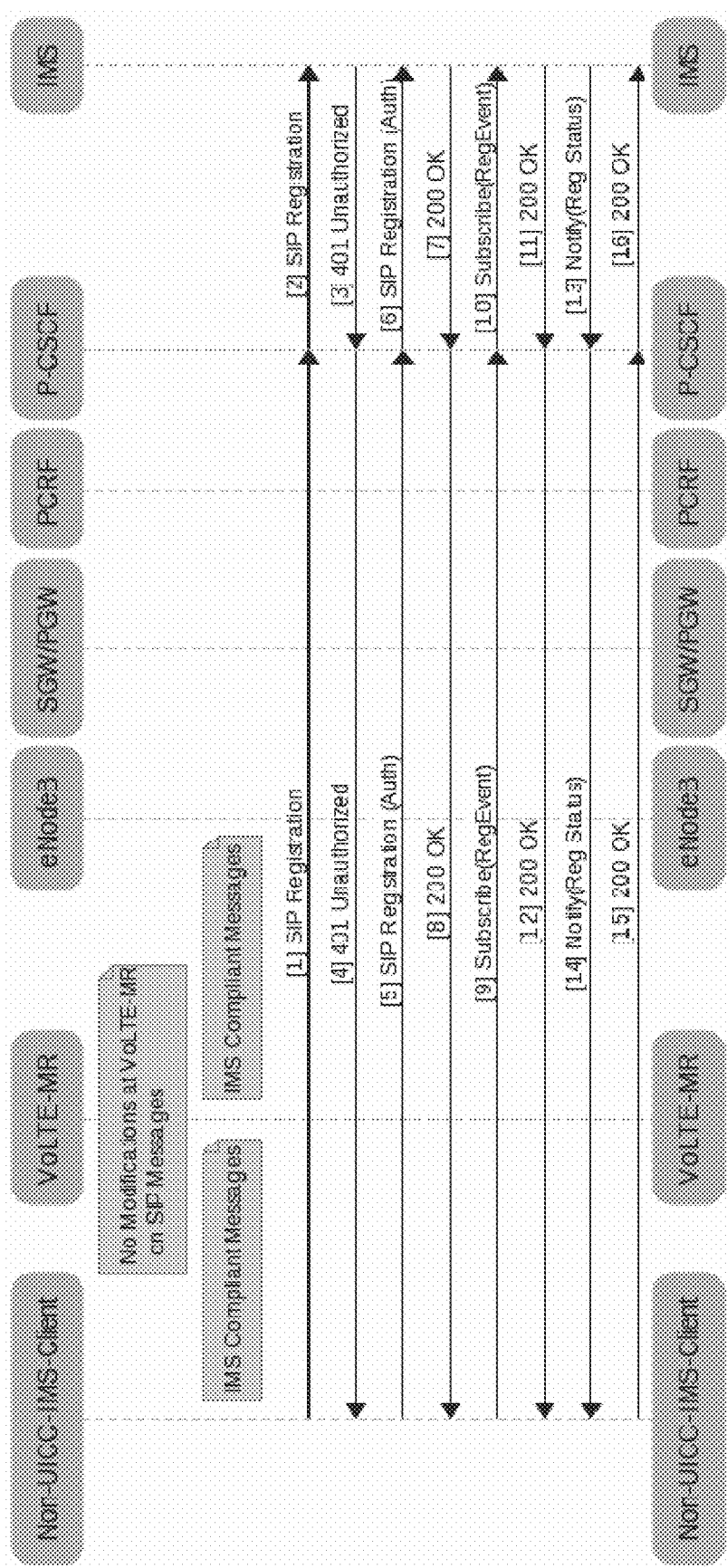
FIG. 25 illustrates an example IMS registration procedure that may be performed for a non-UICC IMS client device in accordance with certain embodiments.
Figure 26:
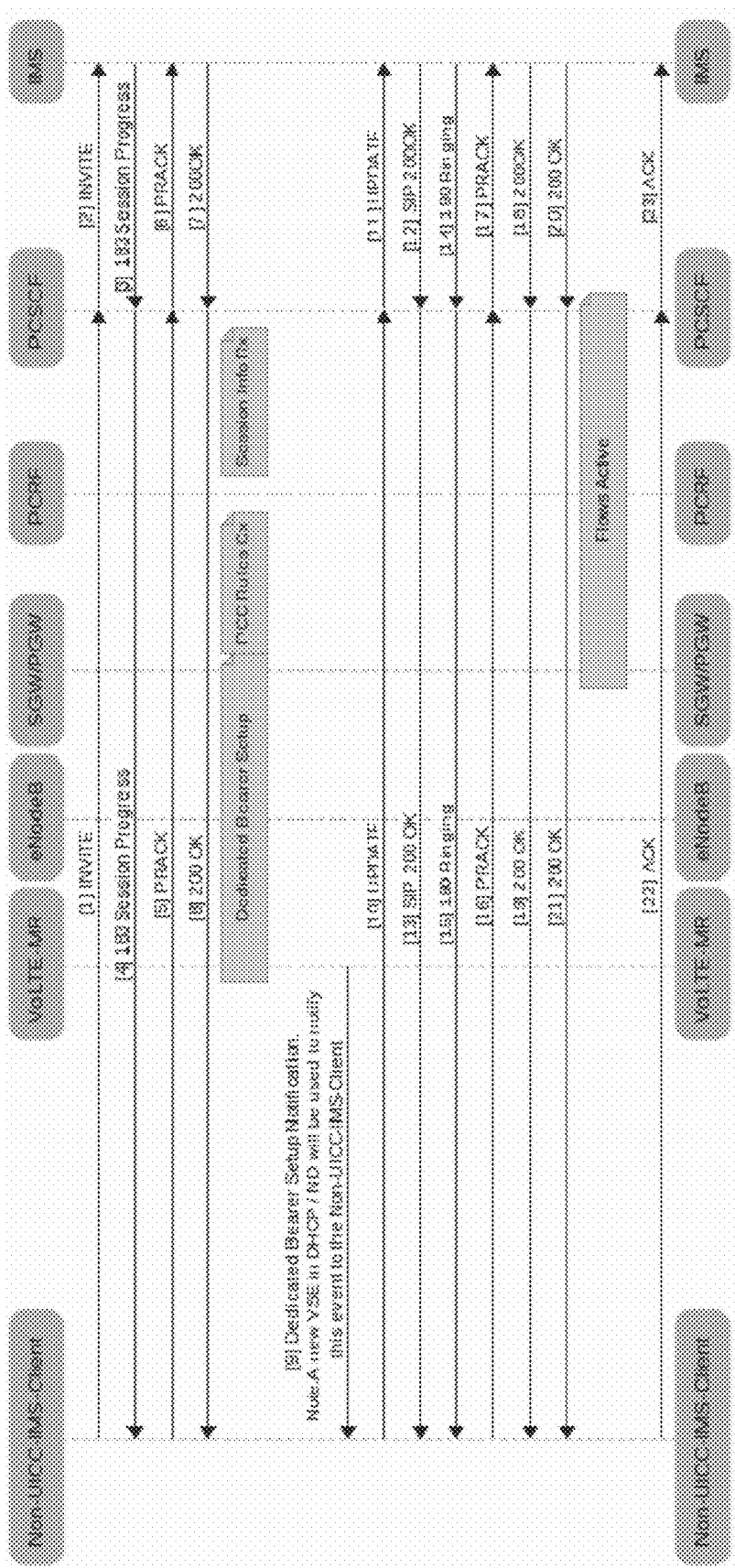
FIG. 26 illustrates an example SIP media session between a non-UICC IMS client device and an IMS network in accordance with certain embodiments.

FIG. 25 illustrates an example IMS registration procedure that may be performed for a non-UICC IMS client device 104 in accordance with certain embodiments and FIG. 26 illustrates an example SIP media session between a non-UICC IMS client device 104 and an IMS network in accordance with certain embodiments. In various embodiments, mobile router 108 may perform an IMS registration process and participate in SIP media sessions for each client device 104 of any number of client devices. In such embodiments, the router 108 provides transport of IMS compatible SIP messages received from client device 104 without modifying the messages. In various embodiments, the mobile router would offer PDN connections, resource reservation, and media transcoding services for non-UICC IMS client devices 104 without modifying the control signaling received from or sent to devices 104.

Figure 27:
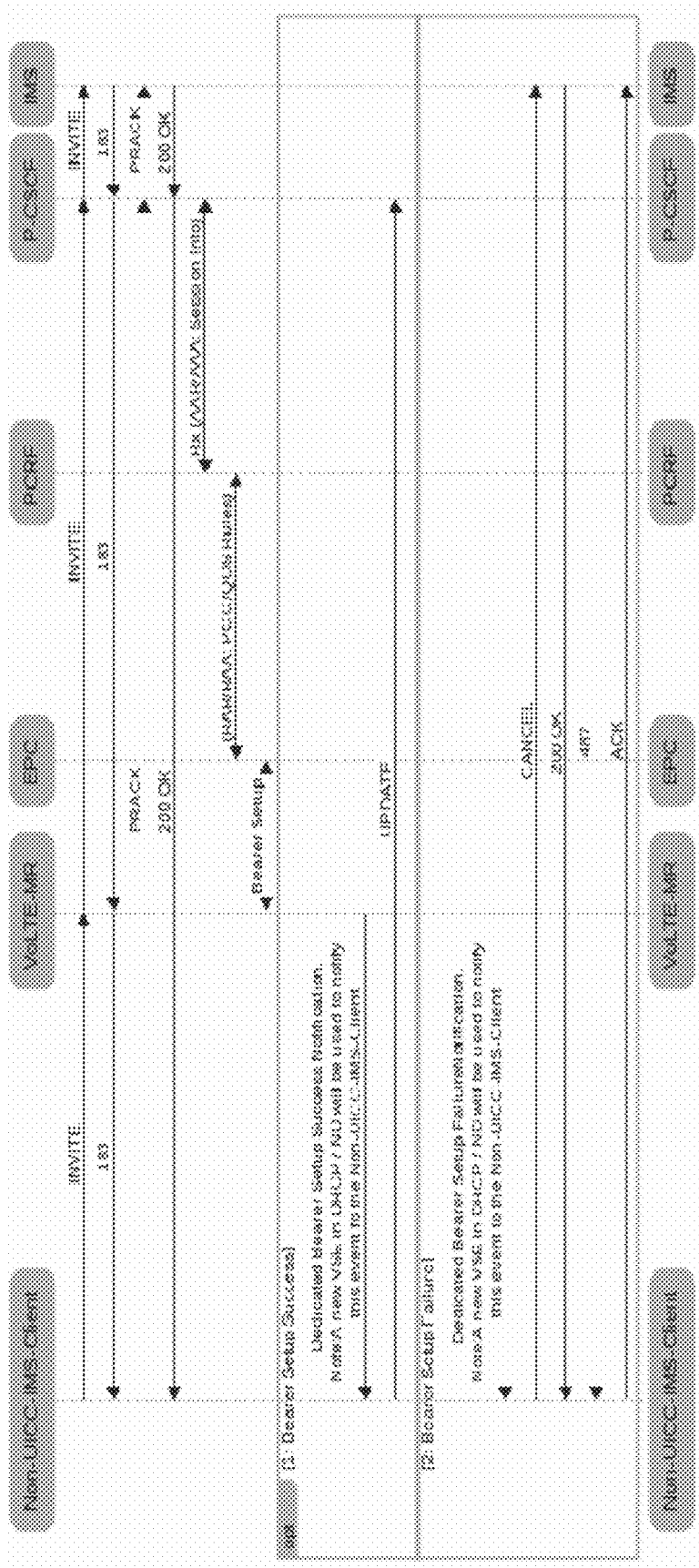
FIG. 27 illustrates an example call flow involving a resource reservation failure with respect to a non-UICC IMS client device in accordance with certain embodiments.

FIG. 27 illustrates an example call flow involving a resource reservation failure with respect to a non-UICC IMS client device 104 in accordance with certain embodiments. In such an embodiment, the router 108 may notify the client device 104 of the bearer establishment status.

Figure 28:
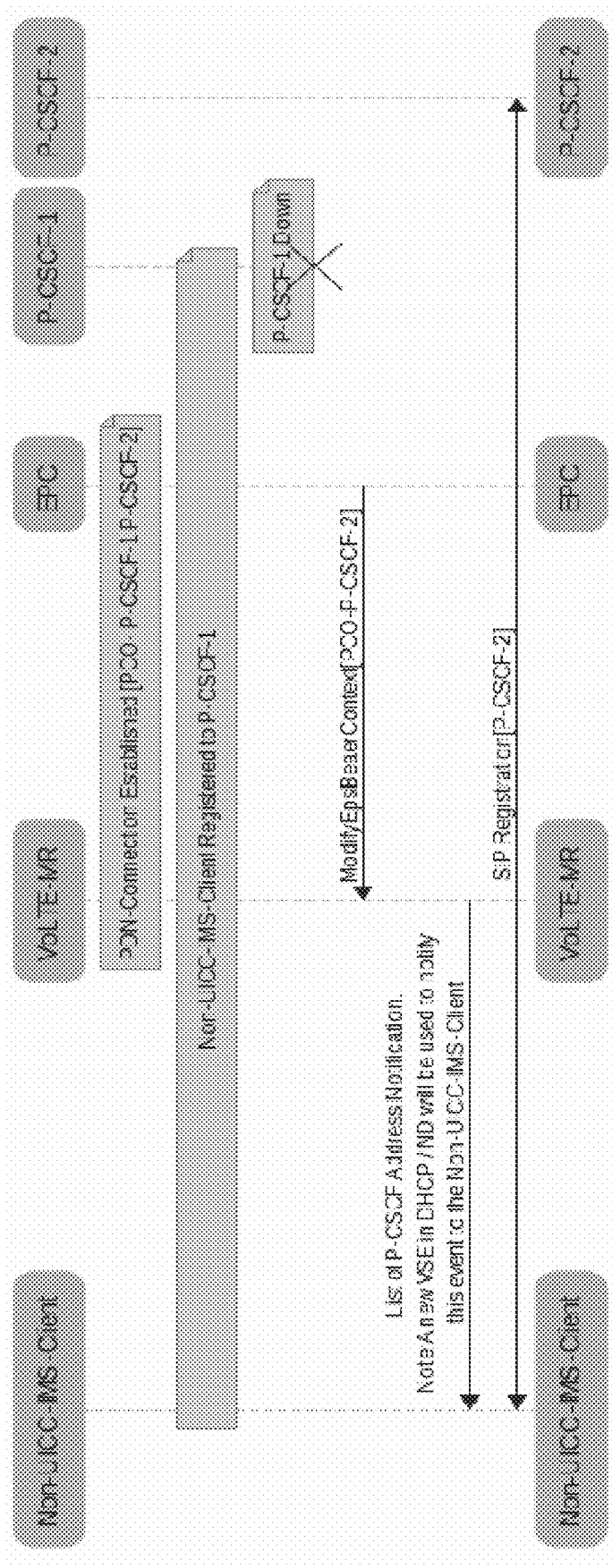
FIG. 28 illustrates an example P-CSCF restoration procedure performed with respect to a non-UICC IMS client device in accordance with certain embodiments.

FIG. 28 illustrates an example P-CSCF restoration procedure performed with respect to a non-UICC IMS client device 104 in accordance with certain embodiments. In such an embodiment, when an original P-CSCF goes down, the router 108 notifies the client device 104 of a new P-CSCF address list that it receives in a PCO option from the LTE core network 114.

Figure 29:
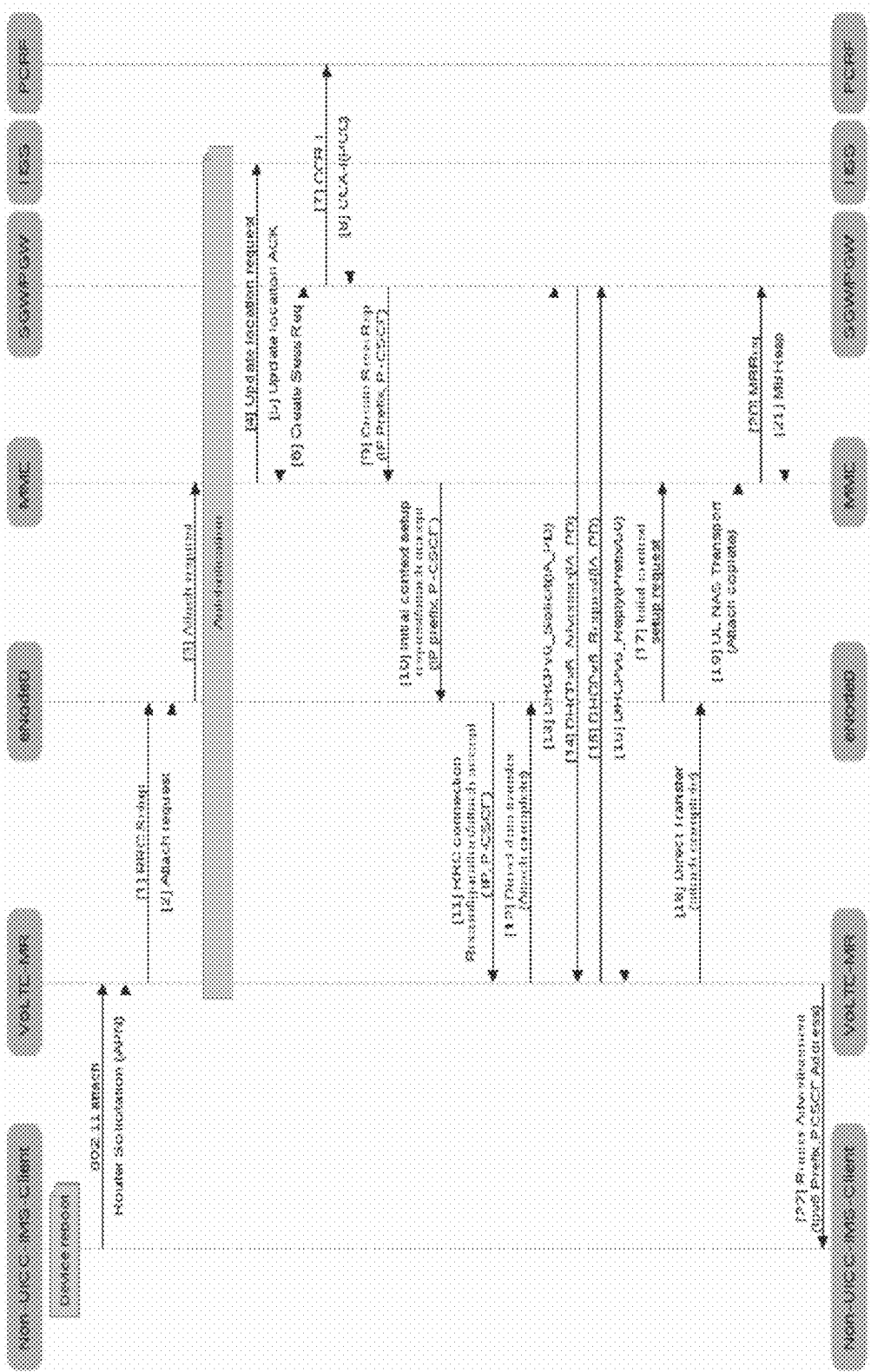
FIG. 29 illustrates a default bearer setup procedure in accordance with certain embodiments.

FIG. 29 illustrates a default bearer setup procedure in accordance with certain embodiments. Although, a non-UICC IMS client device 104 is depicted in the call flow, the default bearer setup procedure may be performed to provide communication for client devices 102 and/or client devices 104. The router may initiate the attach procedure by sending an attach request to an eNodeB of the access network 110. The message may include the router's voice capabilities and preferences. For example, the voice domain preference for UTRAN may have a preferred value of IMS PS Voice and a secondary value of CS voice; the usage setting may be set to voice-centric, and the SRVCC to GERAN/UTRAN capability may be set to SRVCC from UTRAN HSPA or E-UTRAN to GERAN/UTRAN supported. In a particular embodiment, the voice domain preference and usage setting would be fixed for the router 108 and will not vary for individual client devices coupled to the router. The eNodeB may forward the attach request message to a selected MME in an S1-MME control message. The MME may then initiate a procedure for authenticating the router 108 by matching authentication information received from the router 108 with information stored in the HSS. The MME may then send an update location request message to the HSS to update the records for the router (based on the IMSI associated with the router). The subscription profile may then be downloaded from the HSS. The subscription profile for the router 108 may have a default APN matching the IMS network 118 and QoS parameters used for SIP signaling. The MME will select the SGW and PGW for the connection and will initiate the creation of a default bearer for the router 108 by sending a Create Session Request to the selected PGW. The PGW will interact with the PCRF and obtain default PCC rules, bearer authorization, and QoS parameters for the IMS PDN connection. The PGW will also assign an IPv6 prefix or IPv4 address to the router 108. The PGW will send a response to the SGW with an address of the P-CSCF of the IMS network 118. The SGW will forward this response to the MME which then responds to the router 108 with an attach accept message via the eNodeB. The bearer information, bearer QoS, router IP address, and P-CSCF address are sent to the router 108.

The eNodeB may send the initial context response message to the MME. The router 108 sends a direct transfer message including an attach complete indication to the eNodeB. The eNodeB forwards the attach complete message to the MME in an uplink NAS transport message. The MME sends a modify bearer request message to the SGW and the SGW acknowledges by sending a modify bearer response message to the MME. The default bearer is now established and ready to exchange uplink and downlink packets.

Figure 30:
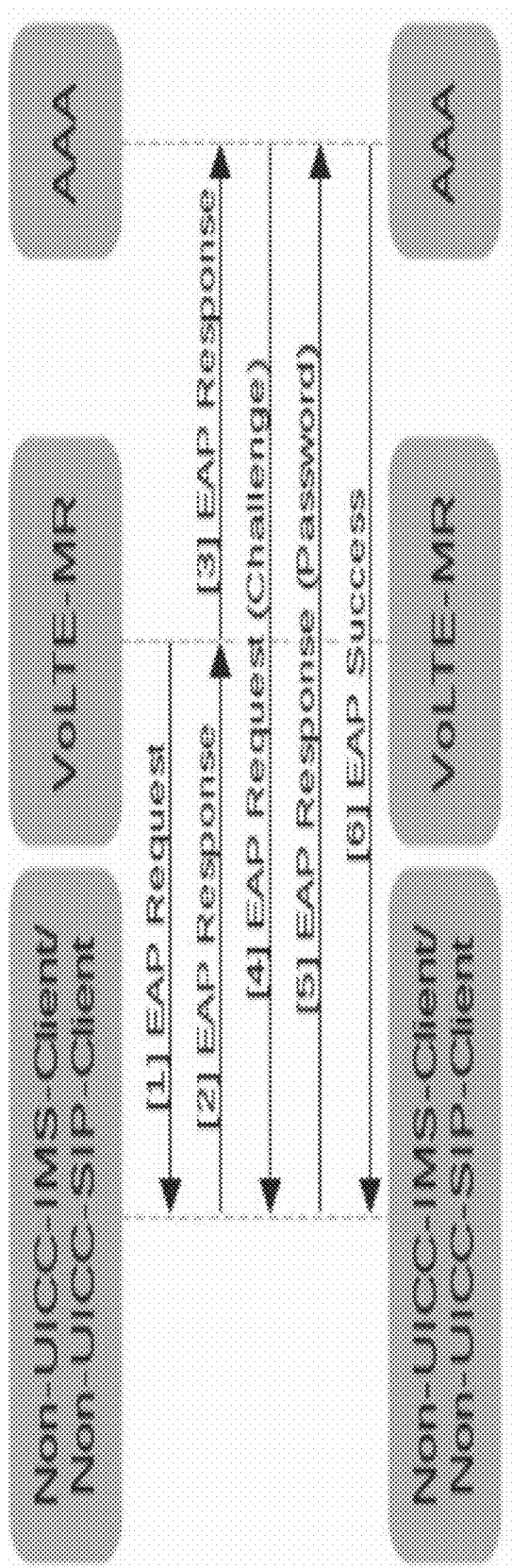
FIG. 30 illustrates a client device authentication procedure in accordance with certain embodiments.

FIG. 30 illustrates a client device authentication procedure in accordance with certain embodiments. In such an embodiment, a client device 102 or client device 104 may be authenticated with a local AAA server while the router 108 behaves as an AAA proxy. In this flow, the client devices may indicate their communication capabilities (e.g., whether they are IMS compliant or not).

"Logic" as used herein may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

Although the examples described herein have focused on the LTE access and core networks, the features of the various embodiments may be used with any suitable cellular networks (such as a 3G network) that is capable of coupling router 108 to an IMS network 118 and supporting IMS compatible SIP signaling.

It is also important to note that the steps in FIGS. 5-6 illustrate only some of the possible scenarios that may be executed by, or within, the devices described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by the devices in that any suitable arrangements, chronologies, configurations, and timing mechanisms may be provided without departing from the teachings of the present disclosure.

Additionally, it should be noted that with the examples provided above, interaction may be described in terms of one or more devices. However, this has been done for purposes of clarity and example only. In certain cases, it may be easier to describe one or more of the functionalities of a given set of flows by only referencing a limited number of devices. It should be appreciated that the systems described herein are readily scalable and, further, can accommodate a large number of components, as well as more complicated/sophisticated arrangements and configurations. Accordingly, the examples provided should not limit the scope or inhibit the broad techniques disclosed herein, as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   connecting, by a router, to a cellular network using at least one authentication credential stored on a smart card of the router;
   receiving, by the router from a client device coupled to the router, a Session Initiation Protocol (SIP) request to register with an Internet Protocol Multimedia Subsystem (IMS) network coupled to the cellular network; and
   sending, by the router, a SIP registration request for the client device to the IMS network, the SIP registration request comprising authorization information associated with the router, wherein the authorization information associated with the router is used by the IMS network to register the client device with the IMS network.

2. The method of claim 1, further comprising adding information to the SIP request received from the client device to generate the SIP registration request that is sent to the IMS network to make the SIP registration request compliant with signaling requirements of the IMS network.

3. The method of claim 1, further comprising:
receiving a response to the SIP registration request from the IMS network;
removing, by the router, information from the response to generate a modified response that is compliant with a SIP protocol used by the client device; and
sending, the modified response to the client device.

4. The method of claim 1, further comprising:
receiving, by the router from the client device, a request to establish a SIP media session;
sending, by the router, a modified request to establish a SIP media session for the client device, wherein the router adds information to the request to establish a SIP media session to generate the modified request to establish a SIP media session such that the modified request to establish a SIP media session is compliant with signaling requirements of the IMS network; and
communicating, by the router, media data associated with a SIP media session established between the client device and the IMS network.

5. The method of claim 1, further comprising transcoding, by the router, media data of a SIP media session between the client device and the IMS network from an encoding format compatible with the IMS network to an encoding format compatible with a SIP protocol used by the client device.

6. The method of claim 1, wherein the client device coupled to the router is a desktop IP telephone.

7. The method of claim 1, wherein the client device communicates using a SIP protocol that is different from a SIP protocol used by the IMS network.

8. The method of claim 1, wherein the client device communicates using a SIP protocol that is the same as a SIP protocol used by the IMS network.

9. The method of claim 1, further comprising sending, by the router, a second SIP registration request for a second client device to the IMS network, the second SIP registration request comprising the authorization information associated with the router.

10. The method of claim 9, wherein the client device and the second client device share the same default bearer for SIP control signaling with the IMS network.

11. An apparatus comprising:
a smart card to store a plurality of authentication credentials;
a communication interface to:
connect to a cellular network using at least one authentication credential stored on the smart card;
receive from a client device a Session Initiation Protocol (SIP) request to register with an Internet Protocol Multimedia Subsystem (IMS) network coupled to the cellular network; and
a processor to generate an SIP registration request comprising authorization information associated with a router, wherein the authorization information associated with the router is used by the IMS network to register the client device with the IMS network; and wherein
the communication interface is further configured to send the SIP registration request to the IMS network.

12. The apparatus of claim 11, wherein the processor is further to add information to the SIP request received from the client device to generate the SIP registration request that is sent to the IMS network to make the SIP registration request compliant with signaling requirements of the IMS network.

13. The apparatus of claim 11, wherein:
the processor is further to remove information from a response received from the IMS network to the SIP registration request in order to generate a modified response that is compliant with a SIP protocol used by the client device; and
the communication interface is further to send the modified response to the client device.

14. The apparatus of claim 11, wherein the apparatus further comprises logic to transcode media data of a SIP media session between the client device and the IMS network from an encoding format compatible with the IMS network to an encoding format compatible with a SIP protocol used by the client device.

15. The apparatus of claim 11, wherein the communication interface is further to send a second SIP registration request for a second client device to the IMS network, the second SIP registration request comprising the authorization information associated with the router.

16. At least one computer-readable non-transitory media comprising one or more instructions that when executed by a processor configure the processor to cause the performance of operations comprising:
connecting to a cellular network using at least one authentication credential stored on a smart card of a router;
receiving, from a client device, a Session Initiation Protocol (SIP) request to register with an Internet Protocol Multimedia Subsystem (IMS) network coupled to the cellular network; and
sending a SIP registration request for the client device to the IMS network, the SIP registration request comprising authorization information associated with the router, wherein the authorization information associated with the router is used by the IMS network to register the client device with the IMS network.

17. The media of claim 16, the instruction further to cause adding information to the SIP request received from the client device to generate the SIP registration request that is sent to the IMS network to make the SIP registration request compliant with signaling requirements of the IMS network.

18. The media of claim 16, the instruction further to cause:
receiving a response to the SIP registration request from the IMS network;
removing, by the router, information from the response to generate a modified response that is compliant with a SIP protocol used by the client device; and
sending, the modified response to the client device.

19. The media of claim 16, the instruction further to cause transcoding media data of a SIP media session between the client device and the IMS network from an encoding format compatible with the IMS network to an encoding format compatible with a SIP protocol used by the client device.

20. The media of claim 16, the instruction further to cause sending a second SIP registration request for a second client device to the IMS network, the second SIP registration request comprising the authorization information associated with the router.

* * * * *